United States Patent
Audet et al.

(10) Patent No.: US 11,281,843 B2
(45) Date of Patent: Mar. 22, 2022

(54) METHOD OF DISPLAYING AXIS OF USER-SELECTABLE ELEMENTS OVER YEARS, MONTHS, AND DAYS

(71) Applicant: 9224-5489 QUEBEC INC., Montreal (CA)

(72) Inventors: Mathieu Audet, Montreal (CA); Francois Cassistat, Montreal (CA)

(73) Assignee: 9224-5489 QUEBEC Inc., Sherbrooke (CA)

( * ) Notice: Subject to any disclaimer, the term of this patent is extended or adjusted under 35 U.S.C. 154(b) by 0 days.

(21) Appl. No.: 16/410,983

(22) Filed: May 13, 2019

(65) Prior Publication Data

US 2019/0340218 A1    Nov. 7, 2019

Related U.S. Application Data

(63) Continuation of application No. 13/624,996, filed on Sep. 24, 2012, now Pat. No. 10,289,657.

(Continued)

(51) Int. Cl.
| | |
|---|---|
| *G06F 40/106* | (2020.01) |
| *G06F 3/04817* | (2022.01) |
| *G06F 3/0482* | (2013.01) |
| *G06F 3/0481* | (2022.01) |
| *G06F 16/904* | (2019.01) |
| *G06F 40/103* | (2020.01) |
| *G06F 3/0485* | (2022.01) |

(52) U.S. Cl.
CPC .......... *G06F 40/106* (2020.01); *G06F 3/0481* (2013.01); *G06F 3/0482* (2013.01); *G06F 3/04817* (2013.01); *G06F 16/904* (2019.01); *G06F 40/103* (2020.01); *G06F 3/0485* (2013.01)

(58) Field of Classification Search
CPC .... G06F 40/106; G06F 16/904; G06F 40/103; G06F 3/0481; G06F 3/04817; G06F 3/0482
USPC ........................................................ 715/229
See application file for complete search history.

(56) References Cited

U.S. PATENT DOCUMENTS

| | | | |
|---|---|---|---|
| 4,616,336 A | 10/1986 | Robertson | |
| 4,653,021 A | 3/1987 | Takagi | |

(Continued)

FOREIGN PATENT DOCUMENTS

| | | |
|---|---|---|
| CA | 2323268 | 4/2002 |
| CA | 2609837 | 12/2012 |

(Continued)

OTHER PUBLICATIONS

The lifestream approach to reorganizing the information world; Nicolas Corriero, Scott Fertig; Eric Freeman and David Gelernter; Apr. 1995; Yale University; United States.

(Continued)

*Primary Examiner* — Hope C Sheffield
(74) *Attorney, Agent, or Firm* — Mathieu Audet

(57) ABSTRACT

The invention pertains to a device and a method for displaying an axis of content on a basis of a year time-scale attribute using a chronological order with a linear time-scale, upon a selection of a month time-scale attribute, displaying an axis of contents including multimedia contents associated with the month time-scale attribute using the chronological order with a non-linear time-scale.

18 Claims, 24 Drawing Sheets

Related U.S. Application Data

(60) Provisional application No. 61/538,879, filed on Sep. 25, 2011.

(56) References Cited

U.S. PATENT DOCUMENTS

| | | |
|---|---|---|
| 4,817,036 A | 3/1989 | Millett |
| 5,101,500 A | 3/1992 | Marui |
| 5,115,504 A | 5/1992 | Belove |
| 5,148,154 A | 9/1992 | MacKay |
| 5,241,624 A | 8/1993 | Torres |
| 5,261,087 A | 11/1993 | Mukaino |
| 5,312,478 A | 5/1994 | Reed |
| 5,337,405 A | 8/1994 | Lindauer |
| 5,353,391 A | 10/1994 | Cohen |
| 5,388,197 A | 2/1995 | Rayner |
| 5,398,074 A | 3/1995 | Duffield |
| 5,414,811 A | 5/1995 | Parulski |
| 5,499,330 A | 3/1996 | Lucas |
| 5,519,828 A | 5/1996 | Rayner |
| 5,524,195 A | 6/1996 | Clanton, III |
| 5,535,063 A | 7/1996 | Lamming |
| 5,537,524 A | 7/1996 | Aprile |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Matthews, III |
| 5,680,605 A | 10/1997 | Torres |
| 5,682,511 A | 10/1997 | Sposato |
| 5,689,287 A | 11/1997 | Mackinlay |
| 5,701,500 A | 12/1997 | Ikeo |
| 5,713,031 A | 1/1998 | Saito |
| 5,740,815 A | 4/1998 | Alpins |
| 5,751,280 A | 5/1998 | Abbott |
| 5,754,183 A | 5/1998 | Berend |
| 5,760,772 A | 6/1998 | Austin |
| 5,781,188 A | 7/1998 | Amiot |
| 5,781,785 A | 7/1998 | Rowe |
| 5,786,816 A | 7/1998 | Macrae |
| 5,794,178 A | 8/1998 | Caid |
| 5,798,766 A | 8/1998 | Hayashi |
| 5,812,124 A * | 9/1998 | Eick .................. H04N 5/44543 725/45 |
| 5,822,751 A | 10/1998 | Gray |
| 5,832,504 A | 11/1998 | Tripathi |
| 5,838,317 A | 11/1998 | Bolnick |
| 5,838,320 A | 11/1998 | Matthews, III |
| 5,838,326 A | 11/1998 | Card |
| 5,838,966 A | 11/1998 | Harlan |
| 5,847,707 A | 12/1998 | Hayashida |
| 5,850,218 A | 12/1998 | LaJoie |
| 5,878,410 A | 3/1999 | Zbikowski |
| 5,880,729 A | 3/1999 | Johnston, Jr. |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,956,708 A | 9/1999 | Dyko |
| 5,966,127 A | 10/1999 | Yajima |
| 5,974,391 A | 10/1999 | Hongawa |
| 5,977,974 A | 11/1999 | Hatori |
| 5,980,096 A | 11/1999 | Thalhammer-Reyero |
| 5,982,369 A | 11/1999 | Sciammarella |
| 5,999,173 A | 12/1999 | Ubillos |
| 6,003,034 A | 12/1999 | Tuli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson |
| 6,061,062 A | 5/2000 | Venolia |
| 6,064,384 A | 5/2000 | Ho |
| 6,067,554 A | 5/2000 | Hohensee |
| 6,078,924 A | 6/2000 | Ainsbury |
| 6,081,817 A | 6/2000 | Taguchi |
| 6,088,032 A | 7/2000 | Mackinlay |
| 6,100,887 A | 8/2000 | Bormann |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,174,845 B1 | 1/2001 | Rattinger |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,253,518 B1 | 7/2001 | Azar |
| 6,262,722 B1 | 7/2001 | Allison |
| 6,266,059 B1 | 7/2001 | Matthews, III |
| 6,266,098 B1 | 7/2001 | Cove |
| 6,275,229 B1 | 8/2001 | Weiner |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | DeStefano |
| 6,310,622 B1 | 10/2001 | Asente |
| 6,313,851 B1 | 11/2001 | Matthews, III |
| 6,317,761 B1 | 11/2001 | Landsman |
| 6,335,742 B1 | 1/2002 | Takemoto |
| 6,337,698 B1 | 1/2002 | Keely, Jr. |
| 6,338,044 B1 | 1/2002 | Cook |
| 6,344,880 B1 | 2/2002 | Takahashi |
| 6,351,765 B1 | 2/2002 | Pietropaolo |
| 6,353,436 B1 | 3/2002 | Reichlen |
| 6,353,831 B1 | 3/2002 | Gustman |
| 6,366,299 B1 | 4/2002 | Lanning |
| 6,380,953 B1 | 4/2002 | Mizuno |
| 6,381,362 B1 | 4/2002 | Deshpande |
| 6,388,665 B1 | 5/2002 | Linnett |
| 6,392,651 B1 | 5/2002 | Stradley |
| 6,418,556 B1 | 7/2002 | Bennington |
| 6,421,828 B1 | 7/2002 | Wakisaka |
| 6,425,129 B1 | 7/2002 | Sciammarella |
| 6,434,545 B1 | 8/2002 | MacLeod |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao |
| 6,487,557 B1 | 11/2002 | Nagatomo |
| 6,491,585 B1 | 12/2002 | Miyamoto |

(56) References Cited

U.S. PATENT DOCUMENTS

| | | |
|---|---|---|
| 6,501,469 B1 | 12/2002 | MacPhail |
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |
| 6,581,068 B1 | 6/2003 | Bensoussan |
| 6,587,106 B1 | 7/2003 | Suzuki |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,606,411 B1 | 8/2003 | Loui |
| 6,611,291 B1 * | 8/2003 | Dow .................. H04N 1/00384 348/239 |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,661,438 B1 | 12/2003 | Shiraishi |
| 6,662,357 B1 | 12/2003 | Bowman-Amuah |
| 6,668,102 B2 | 12/2003 | Chiba |
| 6,671,692 B1 | 12/2003 | Marpe |
| 6,671,693 B1 | 12/2003 | Marpe |
| 6,671,694 B2 | 12/2003 | Baskins |
| 6,675,158 B1 | 1/2004 | Rising, III |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |
| 6,721,760 B1 | 4/2004 | Ono |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada |
| 6,744,967 B2 | 6/2004 | Kaminski |
| 6,754,660 B1 | 6/2004 | MacPhail |
| 6,760,721 B1 | 7/2004 | Chasen |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright |
| 6,879,946 B2 | 4/2005 | Rong |
| 6,889,220 B2 | 5/2005 | Wolff |
| 6,895,552 B1 | 5/2005 | Balabanovic |
| 6,900,807 B1 | 5/2005 | Liongosari |
| 6,901,558 B1 | 5/2005 | Andreas |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording |
| 6,934,916 B1 | 8/2005 | Webb |
| 6,948,124 B2 | 9/2005 | Combs |
| 6,950,989 B2 | 9/2005 | Athsani |
| 6,961,900 B1 | 11/2005 | Sprague |
| 6,965,380 B1 | 11/2005 | Kumata |
| 6,973,628 B2 | 12/2005 | Asami |
| 6,983,227 B1 | 1/2006 | Thalhammer-Reyero |
| 6,985,948 B2 | 1/2006 | Taguchi |
| 6,987,220 B2 | 1/2006 | Holcombe |
| 6,990,637 B2 | 1/2006 | Anthony |
| 7,003,737 B2 | 2/2006 | Chiu |
| 7,007,034 B1 | 2/2006 | Hartman, Jr. |
| 7,010,744 B1 | 3/2006 | Torgerson |
| 7,013,258 B1 * | 3/2006 | Su ..................... G06F 3/013 345/171 |
| 7,019,741 B2 | 3/2006 | Kelly |
| 7,020,848 B2 | 3/2006 | Rosenzweig |
| 7,054,878 B2 | 5/2006 | Gottsman |
| 7,055,104 B1 | 5/2006 | Billmaier |
| 7,075,550 B2 | 7/2006 | Bonadio |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,218,325 B1 | 5/2007 | Buck |
| 7,220,910 B2 | 5/2007 | Plastina |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski |
| 7,293,228 B1 | 11/2007 | Lessing |
| 7,302,649 B2 | 11/2007 | Ohnishi |
| 7,318,196 B2 | 1/2008 | Crow |
| 7,334,191 B1 | 2/2008 | Sivan |
| 7,336,279 B1 | 2/2008 | Takiguchi |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,363,591 B2 | 4/2008 | Goldthwaite |
| 7,366,994 B2 | 4/2008 | Loui |
| 7,372,473 B2 | 5/2008 | Venolia |
| 7,380,260 B1 | 5/2008 | Billmaier |
| 7,418,671 B2 | 8/2008 | Hama |
| 7,418,674 B2 | 8/2008 | Robbins |
| 7,426,057 B2 | 9/2008 | Mori |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi |
| 7,461,088 B2 | 12/2008 | Thorman |
| 7,502,819 B2 | 3/2009 | Alonso |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,698,658 B2 | 4/2010 | Ohwa |
| 7,703,040 B2 | 4/2010 | Cutrell |
| 7,710,423 B2 | 5/2010 | Drucker |
| 7,714,859 B2 | 5/2010 | Shoemaker |
| 7,716,194 B2 | 5/2010 | Williams |
| 7,716,604 B2 | 5/2010 | Kataoka |
| 7,735,102 B1 | 6/2010 | Billmaier |
| 7,739,598 B2 | 6/2010 | Porter |
| 7,739,622 B2 | 6/2010 | DeLine |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,770,217 B2 | 8/2010 | Pueblas |
| 7,788,247 B2 | 8/2010 | Wang |
| 7,788,592 B2 | 8/2010 | Williams |
| 7,792,328 B2 | 9/2010 | Albertson |
| 7,818,378 B2 | 10/2010 | Buchheit |

(56) References Cited

U.S. PATENT DOCUMENTS

| | | |
|---|---|---|
| 7,822,735 B2 | 10/2010 | Suda |
| 7,831,599 B2 | 11/2010 | Das |
| 7,844,074 B2 | 11/2010 | Moskowitz |
| 7,856,424 B2 | 12/2010 | Cisler |
| 7,870,489 B2 | 1/2011 | Serita |
| 7,899,818 B2 | 3/2011 | Stonehocker |
| 7,902,741 B2 | 3/2011 | Iwanaga |
| 7,949,691 B1 | 5/2011 | Franciscus de Heer |
| 7,962,522 B2 | 6/2011 | Norris, III |
| 7,991,720 B2 | 8/2011 | Mander |
| 8,001,481 B2 | 8/2011 | Chakra |
| 8,010,508 B2 | 8/2011 | Audet |
| 8,010,892 B2 | 8/2011 | Audet |
| 8,010,903 B2 | 8/2011 | Dieberger |
| 8,069,404 B2 | 11/2011 | Audet |
| 8,078,966 B2 | 12/2011 | Audet |
| 8,091,033 B2 | 1/2012 | von Sichart |
| 8,099,680 B1 | 1/2012 | Kolde |
| 8,136,030 B2 | 3/2012 | Audet |
| 8,151,185 B2 | 4/2012 | Audet |
| 8,306,982 B2 | 11/2012 | Audet |
| 8,307,355 B2 | 11/2012 | Capomassi |
| 8,316,306 B2 | 11/2012 | Audet |
| 8,341,194 B2 | 12/2012 | Gottsman |
| 8,438,188 B2 | 5/2013 | Norris, III |
| 8,468,467 B2 | 6/2013 | Yamashita |
| 8,601,392 B2 | 12/2013 | Audet |
| 8,607,155 B2 | 12/2013 | Audet |
| 8,701,039 B2 | 4/2014 | Audet |
| 8,707,169 B2 | 4/2014 | Morita |
| 8,739,050 B2 | 5/2014 | Audet |
| 8,762,380 B2 | 6/2014 | Shirai |
| 8,788,937 B2 | 7/2014 | Audet |
| 8,826,123 B2 | 9/2014 | Audet |
| 8,930,895 B2 | 1/2015 | Drukman |
| 8,935,237 B2 | 1/2015 | Andersson |
| 8,984,417 B2 | 3/2015 | Audet |
| 8,990,255 B2 | 3/2015 | Metsatahti |
| 9,058,093 B2 | 6/2015 | Audet |
| 9,081,498 B2 | 7/2015 | Thorsander |
| 9,122,374 B2 | 9/2015 | Audet |
| 9,189,129 B2 | 11/2015 | Cassistat |
| 9,262,381 B2 | 2/2016 | Audet |
| 9,348,800 B2 | 5/2016 | Audet |
| 9,519,693 B2 | 12/2016 | Audet |
| 9,529,495 B2 | 12/2016 | Cassistat |
| 9,588,646 B2 | 3/2017 | Cassistat |
| 2001/0003186 A1 | 6/2001 | DeStefano |
| 2001/0025288 A1 | 9/2001 | Yanase |
| 2001/0034766 A1 | 10/2001 | Morimoto |
| 2001/0055017 A1 | 12/2001 | Ording |
| 2002/0011990 A1 | 1/2002 | Anwar |
| 2002/0032696 A1 | 3/2002 | Takiguchi |
| 2002/0033848 A1 | 3/2002 | Sciammarella |
| 2002/0035563 A1 | 3/2002 | Suda |
| 2002/0052721 A1 | 5/2002 | Ruff |
| 2002/0056129 A1 | 5/2002 | Blackketter |
| 2002/0059215 A1 | 5/2002 | Kotani |
| 2002/0063737 A1 | 5/2002 | Feig |
| 2002/0070958 A1 | 6/2002 | Yeo |
| 2002/0078440 A1 | 6/2002 | Feinberg |
| 2002/0087530 A1 | 7/2002 | Smith |
| 2002/0091739 A1 | 7/2002 | Ferlitsch |
| 2002/0096831 A1 | 7/2002 | Nakayama |
| 2002/0101458 A1 | 8/2002 | SanGiovanni |
| 2002/0105541 A1 | 8/2002 | Endou |
| 2002/0140719 A1 | 10/2002 | Amir |
| 2002/0140740 A1 | 10/2002 | Chen |
| 2002/0143772 A1 | 10/2002 | Gottsman |
| 2002/0152474 A1 | 10/2002 | Dudkiewicz |
| 2002/0180795 A1 | 12/2002 | Wright |
| 2002/0191029 A1* | 12/2002 | Gillespie ............ G06F 3/04817 715/810 |
| 2003/0001898 A1 | 1/2003 | Bernhardson |
| 2003/0001901 A1 | 1/2003 | Crinon |
| 2003/0030664 A1 | 2/2003 | Parry |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0069893 A1 | 4/2003 | Kanai |
| 2003/0090504 A1 | 5/2003 | Brook |
| 2003/0090524 A1 | 5/2003 | Segerberg |
| 2003/0093260 A1 | 5/2003 | Dagtas |
| 2003/0093792 A1 | 5/2003 | Labeeb |
| 2003/0095149 A1 | 5/2003 | Fredriksson |
| 2003/0120681 A1 | 6/2003 | Baclawski |
| 2003/0120737 A1 | 6/2003 | Lytle |
| 2003/0121055 A1 | 6/2003 | Kaminski |
| 2003/0128228 A1 | 7/2003 | Crow |
| 2003/0132971 A1 | 7/2003 | Billmaier |
| 2003/0140023 A1 | 7/2003 | Ferguson |
| 2003/0142136 A1 | 7/2003 | Carter |
| 2003/0149939 A1 | 8/2003 | Hubel |
| 2003/0156119 A1 | 8/2003 | Bonadio |
| 2003/0163468 A1 | 8/2003 | Freeman |
| 2003/0167902 A1 | 9/2003 | Hiner |
| 2003/0190950 A1 | 10/2003 | Matsumoto |
| 2003/0206121 A1 | 11/2003 | Ly |
| 2003/0237047 A1 | 12/2003 | Borson |
| 2004/0003398 A1 | 1/2004 | Donian |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0095376 A1 | 5/2004 | Graham |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0143598 A1 | 7/2004 | Drucker |
| 2004/0150657 A1 | 8/2004 | Wittenburg |
| 2004/0160416 A1 | 8/2004 | Venolia |
| 2004/0163049 A1 | 8/2004 | Mori |
| 2004/0172593 A1 | 9/2004 | Wong |
| 2004/0177319 A1 | 9/2004 | Horn |
| 2004/0189827 A1 | 9/2004 | Kim |
| 2004/0233238 A1 | 11/2004 | Lahdesmaki |
| 2004/0233239 A1 | 11/2004 | Lahdesmaki |
| 2004/0263519 A1 | 12/2004 | Andrews |
| 2005/0022132 A1 | 1/2005 | Herzberg |
| 2005/0060343 A1 | 3/2005 | Gottsman |
| 2005/0060667 A1 | 3/2005 | Robbins |
| 2005/0091596 A1 | 4/2005 | Anthony |
| 2005/0108644 A1 | 5/2005 | Finke-Anlauff |
| 2005/0119936 A1 | 6/2005 | Buchanan |
| 2005/0131959 A1 | 6/2005 | Thorman |
| 2005/0138066 A1 | 6/2005 | Finke-Anlauff |
| 2005/0210410 A1 | 9/2005 | Ohwa |
| 2005/0234843 A1 | 10/2005 | Beckius |
| 2005/0262533 A1 | 11/2005 | Hart |
| 2005/0268237 A1 | 12/2005 | Crane |
| 2005/0268254 A1 | 12/2005 | Abramson |
| 2005/0289482 A1 | 12/2005 | Anthony |
| 2006/0000484 A1 | 1/2006 | Romanchik |
| 2006/0004848 A1 | 1/2006 | Williams |
| 2006/0013554 A1 | 1/2006 | Poslinski |
| 2006/0013555 A1 | 1/2006 | Poslinski |
| 2006/0013556 A1 | 1/2006 | Poslinski |
| 2006/0013557 A1 | 1/2006 | Poslinski |
| 2006/0020966 A1 | 1/2006 | Poslinski |
| 2006/0020971 A1 | 1/2006 | Poslinski |
| 2006/0026170 A1 | 2/2006 | Kreitler |
| 2006/0041521 A1 | 2/2006 | Oral |
| 2006/0045470 A1 | 3/2006 | Poslinski |
| 2006/0048043 A1 | 3/2006 | Kikuchi |
| 2006/0048076 A1 | 3/2006 | Vronay |
| 2006/0075338 A1 | 4/2006 | Kusakabe |
| 2006/0095857 A1 | 5/2006 | Torvinen |
| 2006/0107096 A1 | 5/2006 | Findleton |
| 2006/0116994 A1 | 6/2006 | Jonker |
| 2006/0136246 A1 | 6/2006 | Tu |

(56) References Cited

U.S. PATENT DOCUMENTS

| | | |
|---|---|---|
| 2006/0136466 A1 | 6/2006 | Weiner |
| 2006/0136839 A1 | 6/2006 | Makela |
| 2006/0143574 A1 | 6/2006 | Ito |
| 2006/0155757 A1 | 7/2006 | Williams |
| 2006/0156246 A1 | 7/2006 | Williams |
| 2006/0161867 A1 | 7/2006 | Drucker |
| 2006/0197782 A1 | 9/2006 | Sellers |
| 2006/0200475 A1 | 9/2006 | Das |
| 2006/0209069 A1 | 9/2006 | Bacigalupi |
| 2006/0236251 A1 | 10/2006 | Kataoka |
| 2006/0241952 A1 | 10/2006 | Loduha |
| 2006/0242178 A1 | 10/2006 | Butterfield |
| 2006/0248129 A1 | 11/2006 | Carnes |
| 2006/0259511 A1 | 11/2006 | Boerries |
| 2006/0271884 A1 | 11/2006 | Hurst |
| 2006/0277478 A1 | 12/2006 | Seraji |
| 2006/0277496 A1 | 12/2006 | Bier |
| 2007/0005576 A1 | 1/2007 | Cutrell |
| 2007/0007884 A1 | 1/2007 | Iwanaga |
| 2007/0011150 A1 | 1/2007 | Frank |
| 2007/0024722 A1 | 2/2007 | Eura |
| 2007/0061745 A1 | 3/2007 | Anthony |
| 2007/0061855 A1 | 3/2007 | Serita |
| 2007/0067290 A1 | 3/2007 | Makela |
| 2007/0076984 A1 | 4/2007 | Takahashi |
| 2007/0083505 A1 | 4/2007 | Ferrari |
| 2007/0083527 A1 | 4/2007 | Wadler |
| 2007/0094615 A1 | 4/2007 | Endo |
| 2007/0100842 A1 | 5/2007 | Wykes |
| 2007/0118520 A1 | 5/2007 | Bliss |
| 2007/0120856 A1 | 5/2007 | De Ruyter |
| 2007/0136687 A1 | 6/2007 | Pak |
| 2007/0143803 A1 | 6/2007 | Lim |
| 2007/0156654 A1 | 7/2007 | Ravinarayanan |
| 2007/0168877 A1 | 7/2007 | Jain |
| 2007/0171224 A1 | 7/2007 | MacPherson |
| 2007/0185826 A1 | 8/2007 | Brice |
| 2007/0192749 A1 | 8/2007 | Baudisch |
| 2007/0204218 A1 | 8/2007 | Weber |
| 2007/0208679 A1 | 9/2007 | Tseng |
| 2007/0214169 A1 | 9/2007 | Audet |
| 2007/0216694 A1 | 9/2007 | Audet |
| 2007/0220209 A1 | 9/2007 | Maeda |
| 2007/0239676 A1 | 10/2007 | Stonehocker |
| 2007/0268522 A1 | 11/2007 | Miyamoto |
| 2007/0270985 A1 | 11/2007 | Shellshear |
| 2007/0271508 A1 | 11/2007 | Audet |
| 2007/0272508 A1 | 11/2007 | Toya |
| 2008/0000126 A1 | 1/2008 | Teza |
| 2008/0010605 A1 | 1/2008 | Frank |
| 2008/0015911 A1 | 1/2008 | Wang |
| 2008/0016142 A1 | 1/2008 | Schneider |
| 2008/0019371 A1 | 1/2008 | Anschutz |
| 2008/0022199 A1 | 1/2008 | Sako |
| 2008/0024444 A1 | 1/2008 | Abe |
| 2008/0040665 A1 | 2/2008 | Waldeck |
| 2008/0046844 A1 | 2/2008 | Sugie |
| 2008/0058106 A1 | 3/2008 | Audet |
| 2008/0059897 A1 | 3/2008 | Dilorenzo |
| 2008/0065995 A1 | 3/2008 | Bell |
| 2008/0071822 A1 | 3/2008 | Audet |
| 2008/0072169 A1 | 3/2008 | Audet |
| 2008/0077756 A1 | 3/2008 | Shibata |
| 2008/0092038 A1 | 4/2008 | Audet |
| 2008/0098323 A1 | 4/2008 | Vallone |
| 2008/0104227 A1 | 5/2008 | Birnie |
| 2008/0104534 A1 | 5/2008 | Park |
| 2008/0111826 A1 | 5/2008 | Endrikhovski |
| 2008/0118219 A1 | 5/2008 | Chang |
| 2008/0120571 A1 | 5/2008 | Chang |
| 2008/0133579 A1 | 6/2008 | Lim |
| 2008/0134013 A1 | 6/2008 | Audet |
| 2008/0134022 A1 | 6/2008 | Audet |
| 2008/0140448 A1 | 6/2008 | Hernandez |
| 2008/0141115 A1 | 6/2008 | Audet |
| 2008/0155474 A1 | 6/2008 | Duhig |
| 2008/0163048 A1 | 7/2008 | Gossweiler, III |
| 2008/0174790 A1 | 7/2008 | Noguchi |
| 2008/0184285 A1 | 7/2008 | Park |
| 2008/0186305 A1 | 8/2008 | Carter |
| 2008/0243778 A1 | 10/2008 | Behnen |
| 2008/0244437 A1 | 10/2008 | Fischer |
| 2008/0256473 A1 | 10/2008 | Chakra |
| 2008/0256474 A1 | 10/2008 | Chakra |
| 2008/0270361 A1 | 10/2008 | Meyer |
| 2008/0270928 A1 | 10/2008 | Chakra |
| 2008/0276178 A1 | 11/2008 | Fadell |
| 2008/0282198 A1 | 11/2008 | Brooks |
| 2008/0294651 A1 | 11/2008 | Masuyama |
| 2008/0295016 A1* | 11/2008 | Audet .............. G06F 16/93 715/772 |
| 2008/0295036 A1 | 11/2008 | Ikeda |
| 2008/0298697 A1 | 12/2008 | Lee |
| 2008/0299989 A1 | 12/2008 | King |
| 2008/0301562 A1 | 12/2008 | Berger |
| 2008/0307343 A1 | 12/2008 | Robert |
| 2008/0307348 A1 | 12/2008 | Jones |
| 2009/0018996 A1 | 1/2009 | Hunt |
| 2009/0019371 A1 | 1/2009 | Audet |
| 2009/0033664 A1 | 2/2009 | Hao |
| 2009/0048981 A1 | 2/2009 | McBain Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1* | 2/2009 | Audet .............. G06F 16/93 715/764 |
| 2009/0055776 A1 | 2/2009 | Audet |
| 2009/0063552 A1 | 3/2009 | Jones |
| 2009/0064029 A1 | 3/2009 | Corkran |
| 2009/0064143 A1 | 3/2009 | Bhogal |
| 2009/0070662 A1 | 3/2009 | Audet |
| 2009/0070699 A1 | 3/2009 | Birkill |
| 2009/0083260 A1 | 3/2009 | Artom |
| 2009/0083859 A1 | 3/2009 | Roth |
| 2009/0106684 A1 | 4/2009 | Chakra |
| 2009/0106685 A1 | 4/2009 | Care |
| 2009/0113334 A1 | 4/2009 | Chakra |
| 2009/0116817 A1 | 5/2009 | Kim |
| 2009/0132952 A1 | 5/2009 | Wong |
| 2009/0150832 A1 | 6/2009 | Keller |
| 2009/0164933 A1 | 6/2009 | Pederson |
| 2009/0164944 A1* | 6/2009 | Webster ............ G06F 3/0482 715/838 |
| 2009/0177754 A1 | 7/2009 | Brezina |
| 2009/0199119 A1 | 8/2009 | Park |
| 2009/0199302 A1 | 8/2009 | So |
| 2009/0210862 A1 | 8/2009 | Viswanadha |
| 2009/0217204 A1 | 8/2009 | Yamashita |
| 2009/0228774 A1 | 9/2009 | Matheny |
| 2009/0228788 A1 | 9/2009 | Audet |
| 2009/0235194 A1 | 9/2009 | Arndt |
| 2009/0254850 A1 | 10/2009 | Almeida |
| 2009/0265372 A1 | 10/2009 | Esmann-Jensen |
| 2009/0276733 A1 | 11/2009 | Manyam |
| 2009/0284658 A1 | 11/2009 | Cho |
| 2009/0287693 A1 | 11/2009 | Audet |
| 2009/0288006 A1 | 11/2009 | Audet |
| 2009/0307629 A1 | 12/2009 | Horiuchi |
| 2009/0319933 A1 | 12/2009 | Zaika |
| 2009/0322756 A1 | 12/2009 | Robertson |
| 2010/0023500 A1 | 1/2010 | Bascom |
| 2010/0057576 A1 | 3/2010 | Brodersen |
| 2010/0058226 A1 | 3/2010 | Flake |
| 2010/0070919 A1 | 3/2010 | Araumi |
| 2010/0077355 A1 | 3/2010 | Belinsky |
| 2010/0082427 A1 | 4/2010 | Burgener |
| 2010/0082653 A1 | 4/2010 | Nair |
| 2010/0083159 A1 | 4/2010 | Mountain |
| 2010/0094890 A1 | 4/2010 | Bokor |
| 2010/0110228 A1 | 5/2010 | Ozawa |
| 2010/0145976 A1 | 6/2010 | Higgins |
| 2010/0146380 A1 | 6/2010 | Rousso |
| 2010/0150522 A1 | 6/2010 | Schmehl |

(56) References Cited

U.S. PATENT DOCUMENTS

| | | | |
|---|---|---|---|
| 2010/0169823 A1* | 7/2010 | Audet | G06F 3/0481 715/784 |
| 2010/0171861 A1 | 7/2010 | Ota | |
| 2010/0185509 A1 | 7/2010 | Higgins | |
| 2010/0205563 A1 | 8/2010 | Haapsaari | |
| 2010/0313158 A1 | 12/2010 | Lee | |
| 2010/0313159 A1 | 12/2010 | Decker | |
| 2010/0318200 A1 | 12/2010 | Foslien | |
| 2010/0325132 A1 | 12/2010 | Liu | |
| 2010/0325134 A1 | 12/2010 | Galfond | |
| 2010/0325568 A1 | 12/2010 | Pedersen | |
| 2010/0332512 A1 | 12/2010 | Shpits | |
| 2010/0333031 A1 | 12/2010 | Castelli | |
| 2011/0010667 A1 | 1/2011 | Sakai | |
| 2011/0012927 A1 | 1/2011 | Lin | |
| 2011/0029925 A1 | 2/2011 | Robert | |
| 2011/0035700 A1 | 2/2011 | Meaney | |
| 2011/0061082 A1 | 3/2011 | Heo | |
| 2011/0078166 A1 | 3/2011 | Oliver | |
| 2011/0086675 A1 | 4/2011 | Brinda | |
| 2011/0145745 A1 | 6/2011 | Hyeon | |
| 2011/0154213 A1 | 6/2011 | Wheatley | |
| 2011/0219297 A1 | 9/2011 | Oda | |
| 2011/0239149 A1 | 9/2011 | Lazo | |
| 2011/0246926 A1 | 10/2011 | Newton | |
| 2011/0302556 A1 | 12/2011 | Drukman | |
| 2011/0307814 A1 | 12/2011 | Audet | |
| 2012/0114296 A1 | 5/2012 | Luo | |
| 2012/0131500 A1 | 5/2012 | Fujisawa | |
| 2012/0159320 A1 | 6/2012 | Audet | |
| 2012/0159393 A1 | 6/2012 | Sethi | |
| 2012/0183273 A1 | 7/2012 | Utsuki | |
| 2012/0198385 A1 | 8/2012 | Audet | |
| 2012/0198389 A1 | 8/2012 | Audet | |
| 2012/0249581 A1 | 10/2012 | Cassistat | |
| 2012/0260204 A1 | 10/2012 | Audet | |
| 2012/0262398 A1 | 10/2012 | Kim | |
| 2013/0080880 A1 | 3/2013 | Cassistat | |
| 2013/0080888 A1 | 3/2013 | Audet | |
| 2013/0124990 A1 | 5/2013 | Lettau | |
| 2013/0179777 A1 | 7/2013 | Cassistat | |
| 2013/0179801 A1 | 7/2013 | Audet | |
| 2013/0198190 A1 | 8/2013 | Cassistat | |
| 2013/0198782 A1 | 8/2013 | Arruda | |
| 2013/0218894 A1 | 8/2013 | Audet | |
| 2013/0227470 A1 | 8/2013 | Thorsander | |
| 2013/0227487 A1 | 8/2013 | Cassistat | |
| 2013/0263050 A1 | 10/2013 | Audet | |
| 2013/0290891 A1 | 10/2013 | Audet | |
| 2013/0290897 A1 | 10/2013 | Audet | |
| 2013/0332453 A1 | 12/2013 | Audet | |
| 2013/0332459 A1 | 12/2013 | Audet | |
| 2013/0346106 A1 | 12/2013 | Xiao | |
| 2014/0013243 A1* | 1/2014 | Flynn, III | G06F 16/447 715/753 |
| 2014/0181649 A1 | 6/2014 | Audet | |
| 2014/0223297 A1 | 8/2014 | Audet | |
| 2014/0244625 A1 | 8/2014 | Seghezzi | |
| 2014/0245228 A1 | 8/2014 | Audet | |
| 2015/0019252 A1 | 1/2015 | Dawson | |
| 2015/0324071 A1 | 11/2015 | Audet | |
| 2016/0077689 A1 | 3/2016 | Audet | |
| 2016/0085390 A1 | 3/2016 | Audet | |
| 2016/0092043 A1 | 3/2016 | Missig | |
| 2017/0255368 A1 | 9/2017 | Audet | |
| 2019/0302977 A1 | 10/2019 | Pendergast | |

FOREIGN PATENT DOCUMENTS

| | | |
|---|---|---|
| CA | 2666016 | 7/2014 |
| CA | 2780828 | 10/2015 |
| CA | 2601154 | 9/2016 |
| CA | 2602831 | 9/2016 |
| CA | 2677921 | 6/2017 |
| CA | 2657835 | 9/2017 |
| EP | 2568369 | 3/2013 |
| JP | 07-013971 | 1/1995 |
| JP | 07-085080 | 3/1995 |
| JP | 09-016809 | 6/1995 |
| JP | 08-016612 | 1/1996 |
| JP | 09-265480 | 3/1996 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | WO 2001/22194 | 3/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO-9903271 | 1/1999 |
| WO | WO-2000/65429 | 11/2000 |
| WO | WO-2001/63378 | 8/2001 |
| WO | WO-2001/98881 | 12/2001 |
| WO | WO-02099241 | 12/2002 |
| WO | WO-2003/001345 | 1/2003 |
| WO | WO-2003/032199 | 4/2003 |
| WO | WO-2005/045756 | 5/2005 |
| WO | WO-2005/083595 | 9/2005 |
| WO | WO-2007/095997 | 8/2007 |
| WO | WO-2008/030779 | 3/2008 |

OTHER PUBLICATIONS

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer, Ryan Manuel, Alexandre P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massachsetts Institute of Technology; http://web.archive.org/web/20070415053620/http://haystack.lcs.mit.edu/ ; http://groups.csail.mit.edu/haystack/ ; http://en.wikipedia.org/wiki/Haystack_%28MIT_project%29 ; Published May 10, 2013.

Chandler Project; Grant Baillie, Jeffrey Harris, Sheila Mooney, Katie Capps Parlante, Jared Rhine, Mimi Yin, Eugene Kim, Alex Russell, Andre Mueninghoff, Al Cho, Aleks Totic, Alec Flett, Andi Vajda, Andy Hertzfeld, Aparna Kadakia, Bobby Rullo, Brendan O'Connor, Brian Douglas Skinner, Brian Kirsch, Brian Moseley, Bryan Stearns, Chao Lam, Chris Haumesser, David Surovell, Donn Denman, Ducky Sherwood, Ed Bindl, Edward Chao, Heikki Toivonen, Jed Burgess, John Anderson, John Townsend, Jürgen Botz, Lisa Dusseault, Lori Motko, Lou Montulli, Mark Jaffe, Matthew Eernisse, Michael Toy, Mike Taylor, Mitch Kapor, Morgen Sagen, Pieter Hartsook, Philippe Bossut, Priscilla Chung, Robin Dunn, Randy Letness, Rys McCusker, Stuart Parmenter, Suzette Tauber, Ted Leung, Travis Vachon, Vinubalaji Gopal ; Open Source Applications Foundation ; http://chandlerproject.org/ ; Published May 10, 2013.

Emacs Org-Mode; Carsten, Bastien Guerry, Eric Shulte, Dan Davison, John Wiegley, Sebastian Rose, Nicolas Goaziou, Achim Gratz, Nick Dokos, Russel Adams, Suvayu Ali, Luis Anaya, Thomas Baumann, Michael Brand, Christophe Bataillon, Alex Bochannek, Jan Böcker, Brad Bozarth, Tom Breton, Charles Cave, Pavel Chalmoviansky,

(56) References Cited

OTHER PUBLICATIONS

Gregory Chernov, Sacha Chua, Toby S. Cubitt, Baoqiu Cui, Eddward DeVilla, Nick Dokos, Kees Dullemond, Thomas S. Dye, Christian Egli, David Emery, Nic Ferrier, Miguel A. Figueroa-Villanueva, John Foerch, Raimar Finken, Mikael Fornius, Austin Frank, Eric Fraga, Barry Gidden, Niels Giesen, Nicolas Goaziou, Kai Grossjohann, Brian Gough, Bernt Hansen, Manuel Hermenegildo, Phil Jackson, Scott Jaderholm, Matt Jones, Tokuya Kameshima, Jonathan Leech-Pepin, Shidai Liu, Matt Lundin, David Maus, Jason F. McBrayer, Max Mikhanosha, Dmitri Minaev, Stefan Monnier, Richard Moreland, Rick Moynihan, Todd Neal, Greg Newman, Tim O'Callaghan, Osamu Okano, Takeshi Okano, Oliver Oppitz, Scott Otterson, Pete Phillips, Francesco Pizzolante, Martin Pohlack, T.V. Raman, Matthias Rempe, Paul Rivier, Kevin Rogers, Frank Ruell, Jason Riedy, Philip Rooke, Christopher Schmidt, Paul Sexton, Tom Shannon, Ilya Shlyakhter, Stathis Sideris, Daniel Sinder, Dale Smith, James TD Smith, Adam Spiers, Ulf Stegemann, Andy Stewart, David O'Toole, Jambunathan K, Sebastien Vauban, Stefan Vollmar, Jürgen Vollmer, Samuel Wales, Chris Wallace, David Wainberg, Carsten Wimmer, Roland Winkler, Piotr Zielinski; http://orgmode.org/ ; Published May 10, 2013.

TimeLine: Visualizing Integrated Patient Records; Alex A. T. Bui, Denise R. Aberte, Hooshang Kangarloo ; IEE Transactions on information technology in biomedicine, vol. 11, No. 4, Published Jul. 2007.

ChronoTwigger: A visual analytics tool for understanding source and test co-evolution ; Barret Ens, Daniel Rea, Roiy Shpaner, Hadi Hemmati, James E. Young, POurang Irani ; Department of Computer Science, University of Manitoba, Winnipeg, Canada ; Published 2014.

Translation of foreign reference EP2568369.

Visualization of document collection: the vibe system ; in Information Processing & Management vol. 29. Published by Pergamon Press, Molde (Norway), Published Feb. 3, 1992.

Google Maps + Gallery; Sep. 22, 2005; Larry Doliver.

Canadian Intellectual Property Office—Requisition; Apr. 18, 2017; Simon Chau.

\* cited by examiner

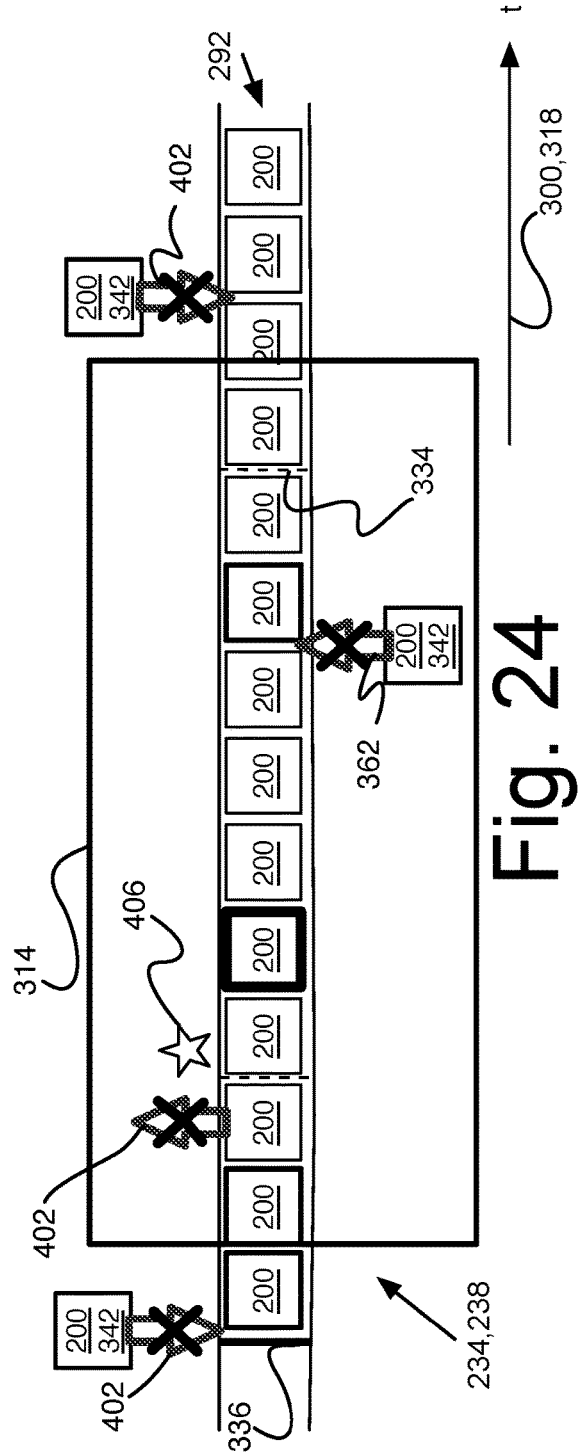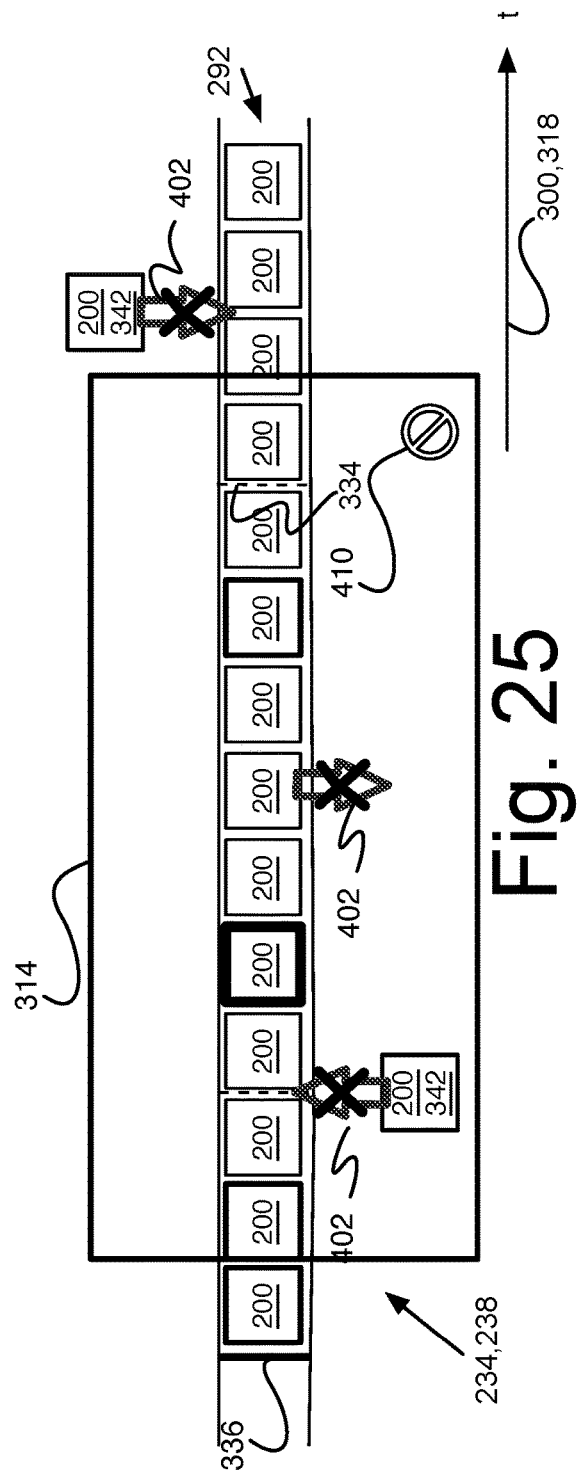

METHOD OF DISPLAYING AXIS OF USER-SELECTABLE ELEMENTS OVER YEARS, MONTHS, AND DAYS

CROSS-REFERENCES

The present invention relates to, claims priority from and is a continuation application from U.S. patent application Ser. No. 13/624,996, filed Sep. 24, 2012, entitled NAVIGATING INFORMATION ELEMENT AXES, now U.S. Pat. No. 10,289,657, which relates to, claims priority from and is a non-provisional application from U.S. Provisional Patent Application No. 61/538,879, filed Sep. 25, 2011, entitled METHOD AND APPARATUS FOR DISPLAYING INFORMATION ELEMENT AXES, which is incorporated herein by reference in its entirety.

BACKGROUND OF THE INVENTION

1. Field of the Invention

This invention relates generally to computer systems adapted to manage information elements disposed on arrays and axes thereof. The present invention more specifically relates to methods and apparatuses for displaying, organizing and navigating among information elements disposed in arrays and axes thereof.

2. Description of the Related Art

Graphical user interfaces (GUIs) are becoming more and more graphically rich in displaying documents, icons and other information elements. Today's lists of documents are turning progressively into highly graphical sequences of documents from which users can attain greater meaning and purpose than before. This is due primarily to the fact that modern GUIs display graphically complex thumbnails, icons and file previews; large number of documents and highly customized ordering of sequences in which the objects displayed are presented.

A sequence of documents may be presented in arrays of various forms, such as an axis, a group of axes or a matrix. The array, if it contains a large number of documents, can extend in its virtual form, outside the display area that is visible to the user. In such cases, the user can scroll or otherwise navigate the array to bring documents that are not visible into the display area. This can, however, be difficult or even confusing if the visible portion of the array of documents displays few or no documents. This can occur in the case when the distribution of documents in the array is uneven. Documents may be unevenly distributed on an axis or a matrix of documents. For example, this can take place if the latter is configured to display documents on a scale divided into successive collation units. For instance, an array collating documents in chronological order would place documents in time units (e.g. by day, month, year, etc.) corresponding to the date assigned to each document by the system or by the user. Some time units, for instance the days of the week, may therefore contain no documents. The lack of documents for a specific time unit would graphically result in empty space in the display area.

If the display area shows large spaces that do not contain any documents, it may then be difficult or impossible for the user to know where the portion(s) of the array containing documents—if any—is located in relation to the display area. On the one hand, it may not be intuitive for the user to scroll a row or column of an array of documents if no document is shown in the portion of the row or column that is visible in the display area. It is also possible that the next visible document in a row or column be located in a time unit that is very far from the one(s) appearing in the display area at that specific moment. The user would then need to scroll for a very long time in order to reach the next document. Likewise, an axis, row or column of an array of documents might not display any document thereon because the display area has gone beyond the first or last document on it. The user might then wrongfully scroll the axis, row or column in a direction where there are simply no more documents to be displayed. Finally, when a group of axes, rows or columns is displayed, the zoom level of the display area is set in such a way that makes it difficult for one to visualize the total number of axes, columns or rows contained by the array. Moreover, this would make it nearly impossible or relatively difficult for one to know the number of axes, columns or rows present in each direction outside of the display area.

In a related fashion, an axis or an array can contain documents that display various degrees of relevance to a user based on the attributes associated with each document or group thereof. Documents, in general, can be unevenly distributed in an array in dependence of they manner in which they are initially organized in the respective array. Finding the documents, from an array, that are deemed relevant by the user may, therefore, be difficult or even confusing when few or no relevant documents appear in the display area.

It is therefore desirable to provide proper indications and means adapted for the navigation of an array of documents when the distribution of documents therein is uneven over the existing art.

It is also desirable to indicate to a user, when few or no documents are displayed in the viewer's display area, if any documents or axes remain in a given direction of an axis, row or column of an array, and if so, how many documents or axes remain in that direction.

It is equally desirable to indicate to a user how far the next non-displayed document is located on a given axis, row, or column of an array of documents.

It is also desirable to provide indications and means for efficiently navigating an axis, row or column of an array of documents when few or no documents are displayed in the display area in order to help a user bring the next non-displayed document into the display area without having to manually scroll through all the empty collation units in the axis, row, or column of the array.

It is also desirable to provide an improved method for simultaneously navigating all the axes, rows or columns of the array in order to change the portion of the array of documents that is displayed in a display area.

It is yet also desirable to provide a method and system adapted to find and navigate documents deemed relevant by a user when such documents are located on an axis, row or column of a display but are not displayed in the user's display area.

Other deficiencies will become apparent to one skilled in the art to which the invention pertains in view of the following summary and detailed description with its appended figures.

SUMMARY OF THE INVENTION

One aspect of the present invention is to alleviate one or more of the shortcomings of the background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention is generally described as a method, a system, a device and/or a graphical user interface used to represent multiple computer files, documents, or other data on axes in an axis-based graphical user interface (GUI).

Aspects of our work provide a method and system allowing a user to efficiently navigate arrays of documents, or a portion thereof, when document-less portions of the array displayed on the screen bring uncertainty as to the number and location of documents in the array. This is made possible by the indications provided by the system concerning the number and location of documents in the array and by means provided by the system to reach those documents in an expeditious manner.

One aspect of the instant invention provides a method, an apparatus and a graphical user interface adapted to present arrays of documents as a single axis, row, or column or a plurality thereof, and in which a distribution of documents is graphically uneven, hence leaving empty spaces on the axes that can create uncertainty concerning the presence, the number and location of other documents disposed on the axes, and wherein mechanisms are provided to identify the presence and the location of documents disposed outside the display area to facilitate navigation thereto.

Moreover, one other aspect of the instant invention provides a method, an apparatus and a graphical user interface adapted to present arrays of documents of various degrees of relevance to the user, hence possibly leaving spaces in the display area where no documents deemed relevant by the user are shown, and wherein mechanisms are provided to identify the presence and the location of relevant documents disposed outside the display area and to enable filtered navigation of the array to the next relevant documents.

An aspect of the instant invention provides a method, an apparatus and a graphical user interface adapted to identify and provide navigational capability associated with documents located outside of the display area of a display at specific and predetermined positions within an array of documents.

In one aspect of the instant invention, a functionality is provided for indicating to a user the presence, the number of and direction in which documents not visible in a display area are located on an axis, row or column and is further adapted to bring the non-displayed documents into a display area, and wherein the functionality is provided when applicable.

Another aspect of the present invention provides a mechanism adapted to indicate to a user that a document is the first or last on the axis, row or column.

Another aspect of the present invention provides a mechanism adapted to allow direct navigation to a document or axis that is not displayed in a user's display area.

A further aspect of the instant invention provides a functionality adapted to indicate to a user the number and direction of axes not visible in a display area and is further adapted to bring the non-displayed axes into the display area, and wherein the functionality is provided when applicable.

In another aspect of the instant invention, a feature is provided for collectively navigating all the axes displayed in the display area (pan function) to axes or sections thereof located outside the display area.

In one other aspect of the present invention, a mechanism is provided adapted to move the display area over axes directly to a next document thereon when the display area is moved to a location where no documents were displayed.

In yet another aspect of the instant invention, a method is provided for indicating to a user the presence, the number and location of documents deemed relevant in a query when the documents contained in an array bear a plurality of attributes possibly designating varying degrees of relevance to the user.

In one other aspect of the invention, a mechanism is provided to enable filtered navigational capability to documents located outside of the display area at specific and predetermined positions within an array of documents according to a query specifying a criterion for relevance.

In another aspect, a mechanism is provided to enable direct navigation of an axis, row, column or group of axes to non-displayed relevant documents on the basis of a query.

In one aspect of the instant invention, a mechanism is provided for indicating to a user where the next viewable documents on one or many axes are when no documents are shown in the display area.

In one other aspect of the instant invention, a mechanism is provided to reach and display documents not visible in a display area that are located at a specific and predetermined location of an axis, row, or column.

Embodiments of the subject invention can be embodied as a computer system, a method, an operating system and a graphical user interface adapted to manage data and documents by juxtaposing the data on axes of documents in a manner such that data, documents and axes thereof are parametrizable and usable by a plurality of users and can be displayed according to a selection of information, metadata or attributes as deemed relevant by user or users in a single-user or networked environment.

Another aspect of our work provides an object-oriented computing system. The computing system comprises a processor, a memory coupled to the processor, and an interface. The computer system comprises a computer-readable storage medium storing instructions, such as a software program adapted to carry out the embodiments. The instructions that, when executed, provide a processor-based system the steps to modify the type and quantity of information used to build and display a document, axis, group of axes and/or workspace on a variety of devices including but not limited to computers, mobiles phones or tablets.

In another aspect of our work, a graphical user interface is provided. The graphical user interface displays one or more axes of documents in accordance with the implementation of a method that manages documents and the data associated therewith.

An object of the invention provides a non-transitory computer-readable medium having stored thereon computer-readable instructions that, when executed by a computer, cause the computer to perform operations for managing information elements, the operations comprising: displaying an array of information elements adapted to receive thereon information elements, the array of information elements virtually extending outside a viewing area, the array of information elements including a portion thereof having no information elements thereon; and displaying an indicator of a non-displayed information element present on the axis of information elements outside a viewing area.

Another object of the invention provides a method of managing information elements, the method comprising:

displaying an array of information elements adapted to receive thereon information elements, the array of information elements virtually extending outside a viewing area, the array of information elements including a portion thereof having no information elements thereon; and displaying an indicator of a non-displayed information element present on the axis of information elements outside a viewing area.

One other object of the present invention provides an apparatus including a graphical user interface configured to provides a graphical rendering of information elements along axes of information elements and operations adapted to inform a user of the apparatus of locations of information elements outside a viewing area of the apparatus, the operations comprising: displaying an array of information elements adapted to receive thereon information elements, the array of information elements virtually extending outside the viewing area, the array of information elements including a portion thereof having no information elements thereon; and displaying an indicator of a non-displayed information element present on the axis of information elements outside a viewing area.

Each of the embodiments of the present invention has at least one of the above-mentioned objects and/or aspects, but does not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

FIG. 24 is a schematic illustration of a display area with navigation means thereon in another context of axes layout using several groups of axes in accordance with an embodiment of the present invention; and FIG. 25 is a schematic illustration of a display area moving on an axis in response to a query seeking to display the next relevant document on the axis (filtered navigation).

DESCRIPTION OF EMBODIMENT(S) OF THE INVENTION

Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

The features provided in this specification mainly but might not exclusively relate to principles of computer software and machine-readable code/instructions adapted to instruct a computer, many computers or other machines adapted to use the instructions to provide material effects on a display, or other means enabling human-computer interactions to manage documents, menus, user-selectable elements and other computer files. These code/instructions are preferably stored on a machine-readable medium to be read and acted upon with a computer or machine having the appropriate code/instructions reading capability.

Figure 1:
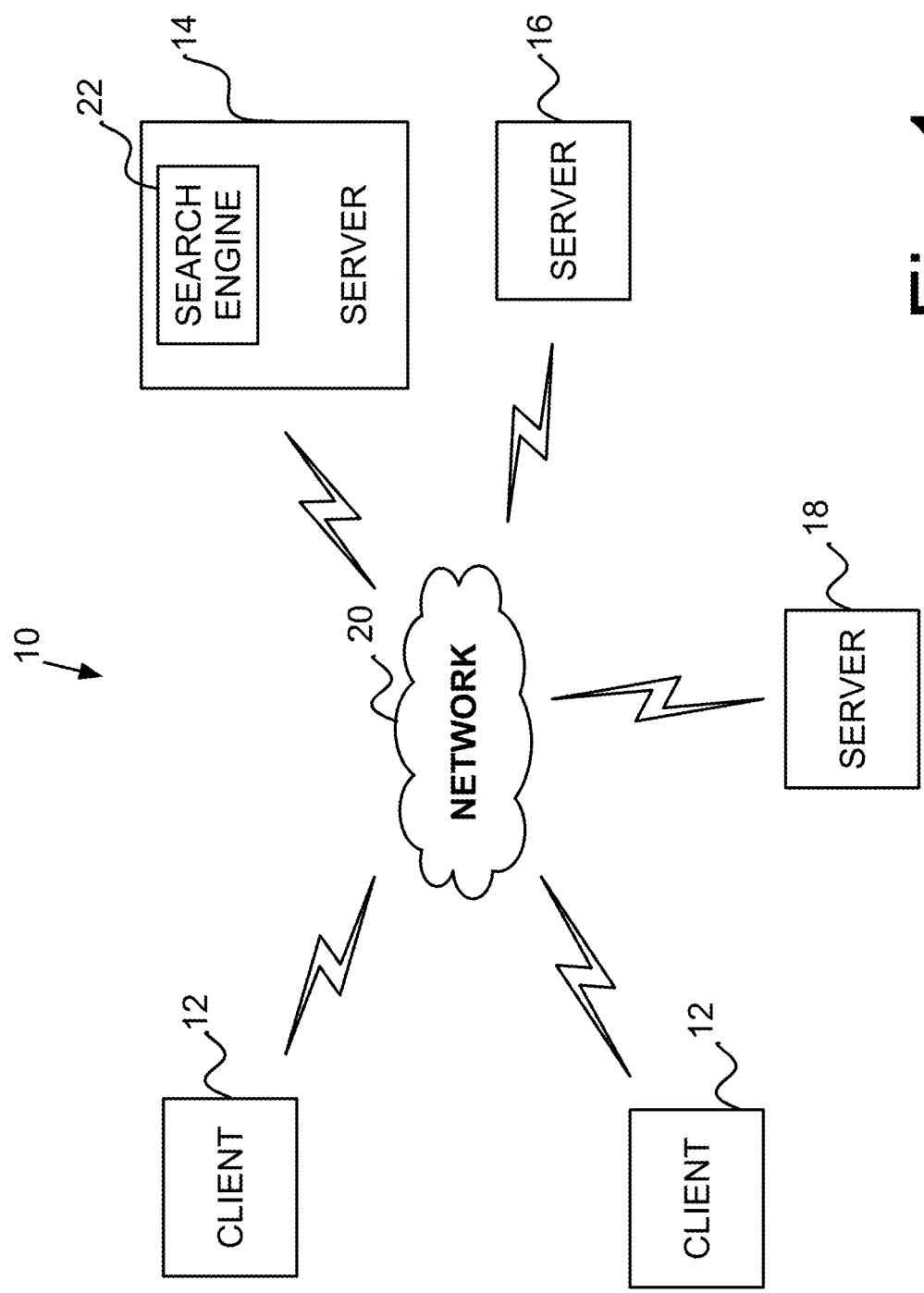
FIG. 1 is a schematic illustration of an exemplary network.

FIG. 1 illustrates an exemplary network 10 in which a system and a method, consistent with the present invention, may be implemented. The network 10 may include multiple client devices 12 connected to multiple servers 14, 16, 18 via a network 20. The network 20 may include a local area network (LAN), a wide area network (WAN), a phone network, such as the Public Switched Phone Network (PSTN), an intranet, the Internet, Wi-Fi, WiMAX or a combination thereof. Two client devices 12 and three servers 14, 16, 18 have been illustrated as connected to network 20 for simplicity. In practice, there may be more or less client devices and servers 14, 16, 18. Also, in some instances, a client 12 device may perform the functions of a server 14, 16, 18 and a server 14, 16, 18 may perform the functions of a client 12 device.

The client devices 12 may include devices such as mainframes, minicomputers, personal computers, laptops, personal digital assistants, phones, or the like, capable of connecting to the network 20. The client devices 12 may transmit data over the network 20 or receive data from the network 20 via a wired, wireless, or optical connection.

The servers 14-18 may include one or more types of computer systems, such as a mainframe, minicomputer, or personal computer, capable of connecting to the network 20 to enable servers 14-18 to communicate with the client devices 12. In alternative implementations, the servers 14-18 may include mechanisms for directly connecting to one or more client devices 12. The servers 14-18 may transmit data over the network 20 or receive data from the network 20 via a wired, wireless, or optical connection.

In an implementation consistent with the present invention illustratively embodied herein, the servers 14-18 may include a search engine 22 usable by the client devices 12. The servers 14-18 may store documents 200, such as web pages, accessible by the client devices 12.

Figure 2:
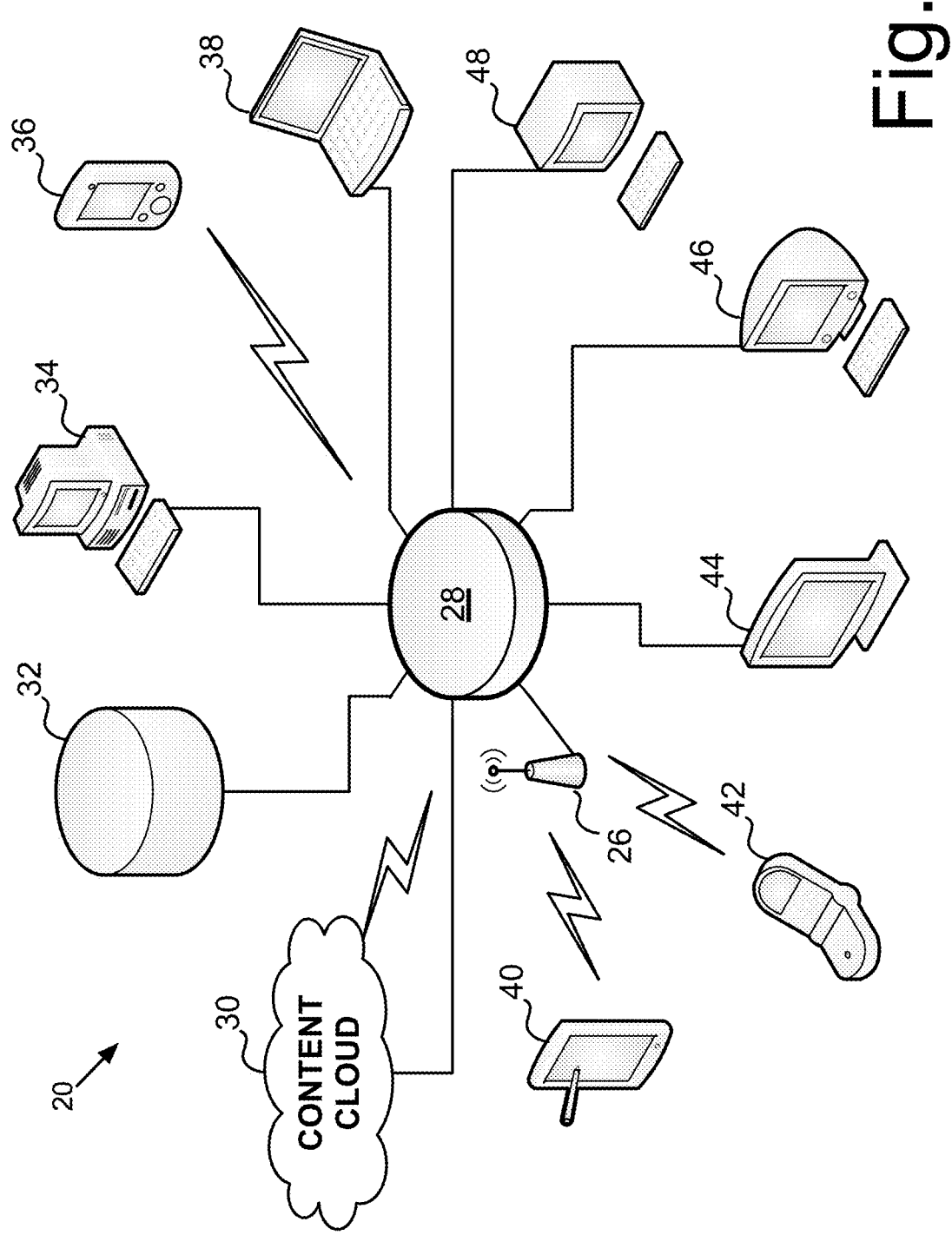
FIG. 2 is a schematic illustration of an alternate exemplary network.

With reference to FIG. 2, a network 20 includes the content cloud 30, a content database 32, content devices 34-38, and other devices 40-48. The network mediator 28 enables network devices 34-48 to communicate with each other without pre-configuring each device 34-48. The content cloud 30 represents a content source such as the Internet, where content exists at various locations across the globe that could be reached through a wired connection and/or with a wireless connection provided by an antenna 26. The content includes multimedia content such as audio and video. The mediator 28 allows the content cloud to provide content to devices 34-48. The database 32 is a storage device 166 that maintains content. The database 32 may be a standalone device on an external communication network. The mediator 28 communicates with the database 32 to access and retrieve content. The content devices 34-48 include intelligent devices, such as, for example, personal computers, laptops, cell phones and personal digital assistants. The content devices 34-48 are capable or storing content data. The devices 34-48 are intelligent devices that receive content from other content devices 30-48. However, the devices 34-48 can also operate as servers to distribute content to other client devices if desirable.

The following discussion provides a brief, general description of an exemplary computer apparatus in which at least some aspects of the present invention may be implemented. The present invention will be described in the general context of computer-executable instructions, such as program modules 174 being executed by a computerized device. However, methods of the present invention may be affected by other apparatuses. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be implemented with other configurations, including hand-held devices, multiprocessor system, microprocessor-based or programmable consumer electronics, network computers, minicomputers, set top boxes, mainframe computers, gaming consoles and the like. At least some aspects of the present invention may also be carried out in distributed computing environments where tasks are performed by remote processing devices linked through a communications network as exemplified in FIG. 2. In a distributed computing environment, program modules 174 may be located in local and/or remote memory storage devices 166.

Figure 3:
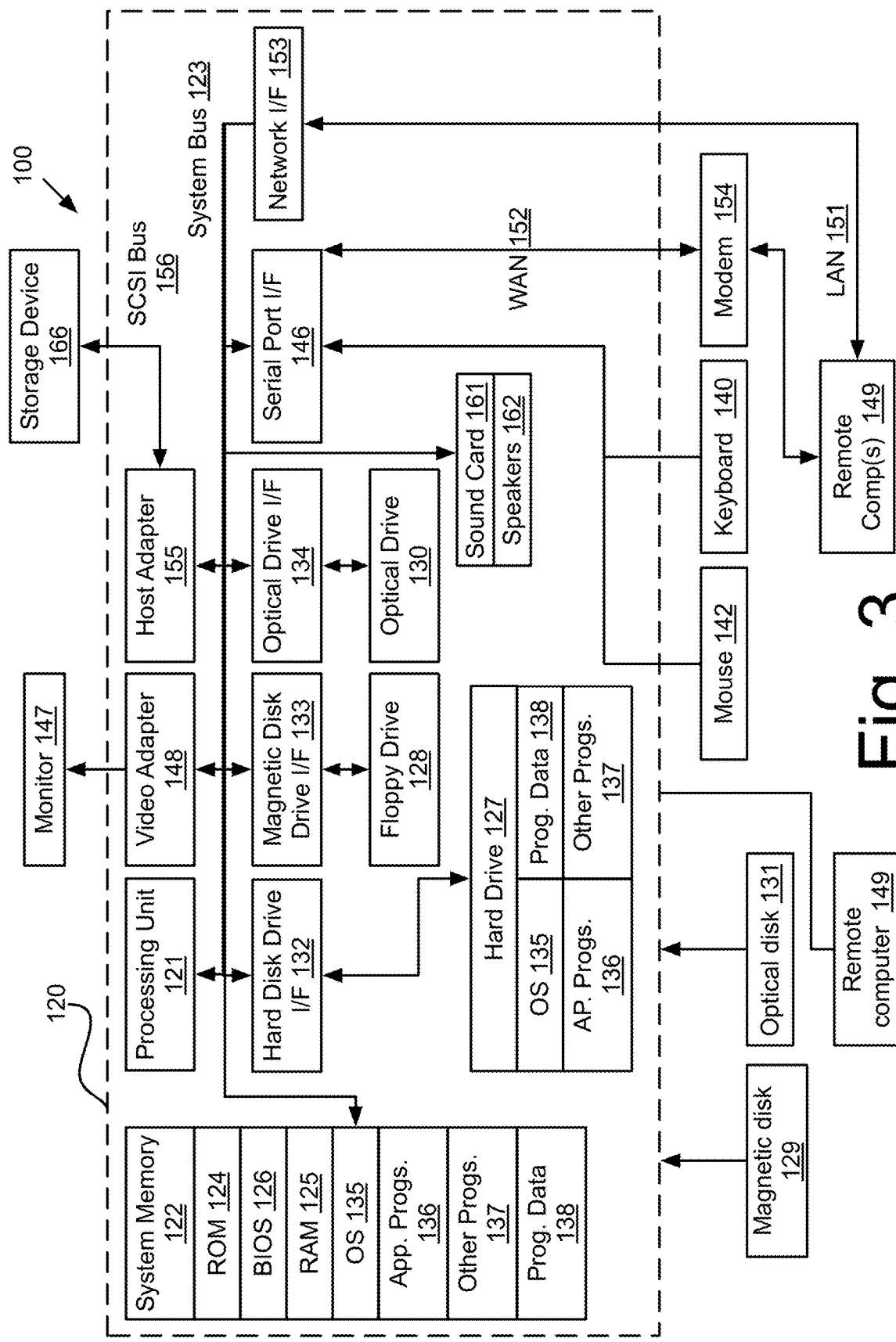
FIG. 3 is a schematic illustration of an exemplary computer system.

With reference to FIG. 3, an exemplary apparatus 100 for implementing at least some aspects of the present invention includes a general-purpose computing device in the form of a computer 120 or in the form of a computerized portable apparatus. The computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computer 120, such as during start-up, may be stored in ROM 124. The computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine-readable instructions, data structures, program modules 174 and other data for the computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), remote cloud storage and the like, may be used instead of, or in addition to, the storage devices 166 introduced above.

A number of program modules 174 may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash.), one or more application programs 136, other program modules 137 (such as Alice™, which is a research system developed by the User Interface Group at Carnegie Mellon University available at www.Alice.org, OpenGL® from Silicon Graphics Inc. of Mountain View Calif., or Direct 3D from Microsoft Corp. of Bellevue Wash.), and/or program data 138 for example.

A user may enter commands and data into the computer 120 through input devices, such as a keyboard 140, a camera 141 and a pointing device 142 Other input devices (not shown) such as a microphone, joystick, game pad, satellite dish, scanner, a touch sensitive screen, accelerometers or a motion-sensor detector such as KINECT™ that are adapted to sense movements of the user or movements of a device, or the like, may also be included. These and other input devices are often connected to the processing unit 121 through a serial port interface 146 coupled to the system bus 123. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device 150 may also be connected to the system bus 123 via an interface, such as a video adapter 148 for example. The video adapter 148 may include a graphics accelerator. One or more speakers 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computer 120 may include other peripheral output devices (not shown), such as a printer, a hi-definition television and a scanner for example. As an alternative or an addition to the video monitor 147, a stereo video output device, such as a head mounted display or LCD shutter glasses for example, could be used.

The computer 120 may operate in a networked environment defining logical connections to one or more remote computers 120, such as a remote computer 149. The remote computer 149 may be another computer 120, a server 14-18, a router, a network PC, a peer device or other common network node, and may include many or all of the elements described above relative to the computer 120. The logical connections depicted in FIG. 3 include a local area network (LAN) 151 and a wide area network (WAN) 152, an intranet and the Internet.

When used in a LAN, the computer 120 may be connected to the LAN 151 through a network interface adapter (or "NIC") 153. When used in a WAN, such as the Internet, the computer 120 may include a modem 154 or other means for establishing communications over the wide area network 152 (e.g. Wi-Fi, WinMax). The modem 154, which may be internal or external, may be connected to the system bus 123 via the serial port interface 146 or another type of port interface. In a networked environment, at least some of the program modules depicted relative to the computer 120 may be stored in the remote memory storage device 166. The network connections shown are exemplary and other means of establishing a communications link between the computers 120 may be used.

Figure 4:
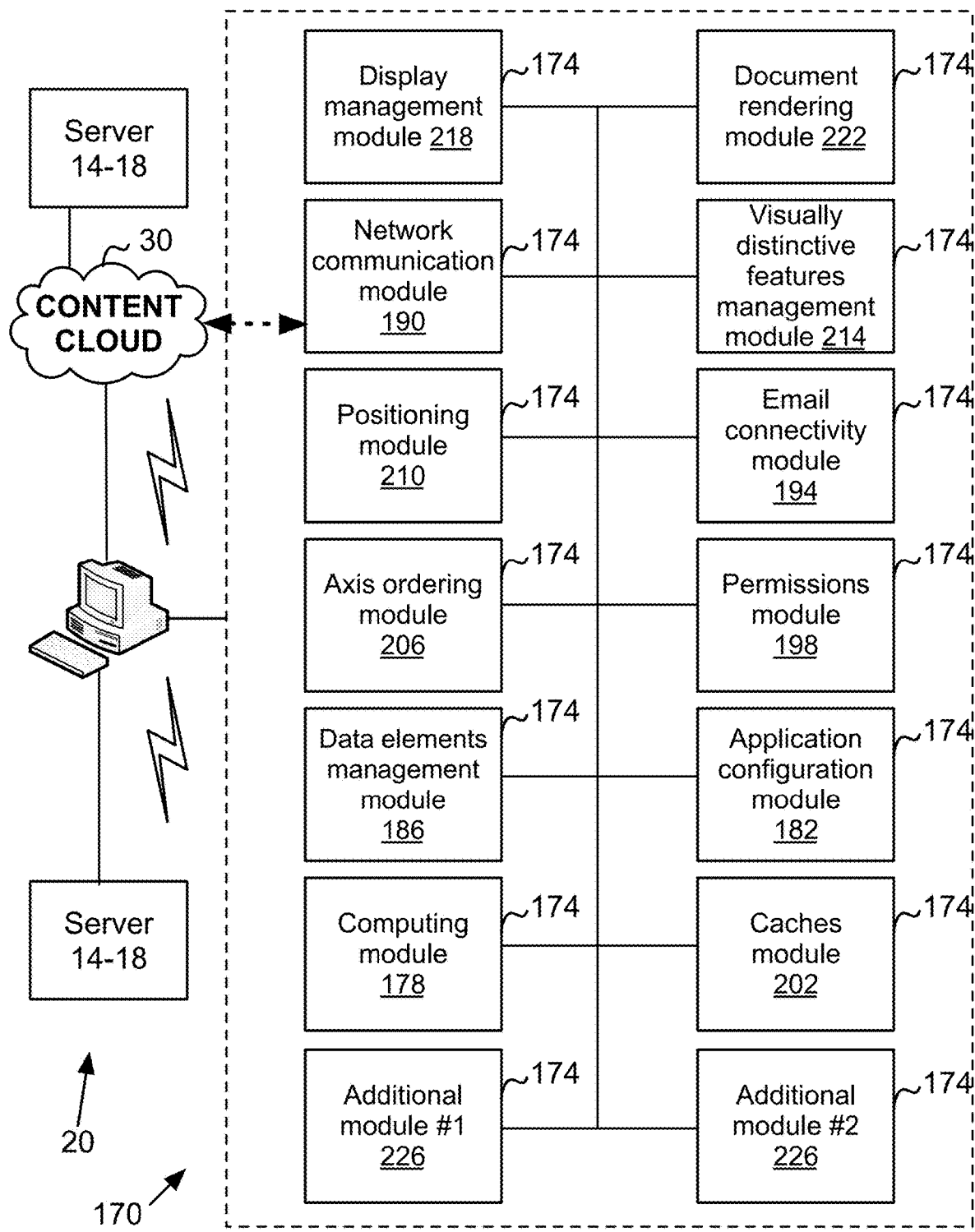
FIG. 4 is a schematic illustration of an exemplary software system.

The exemplary network and the exemplary computer system described above are adapted to carry on the following embodiments:

A system 170 is depicted in FIG. 4 which may represent the functionalities described in the instant application when run on an apparatus 100, for instance a computer 120, such as has been previously described. The computer 120 may in turn be connected to a server 14-18 comprising a set of program modules 174 enabling functions including but not limited to: computing, document rendering, network communication, application configuration and local database management.

The software system 170 illustratively consists of a collection of at least twelve modules 174 independent from those of the server 14-18 that together carry out the method required for the functionalities to be visible on a graphical user interface and usable by the user. As illustrated, additional modules 226 may also be used in conjunction with the twelve base modules.

A computing module 178 provides a means to circulate data between users, the other modules 174 and the apparatus 100. The computing module 178 is adapted to convert queries 230, which may be system-based or user-based, into graphical rendering in accordance with at least one embodiment of the present invention. The other modules 174 are configured to send to and receive data from the computing module and to individually or collectively interact with other modules 174.

An application configuration module 182 provides software configuration to manage application settings and open connections to other servers 14-18. Other modules 174 may use the application configuration module 182 to manage their behavior to satisfy user-specific needs.

A data elements management module 186 may be used in conjunction with other modules to manage data elements such as documents 200 contained in a database 32 in response to a query 230. The data elements management module 186 may use any kind of database connection and may use a network communication module 190 in order to access a database 32 through a network 28, on a server computer 14-18. The network communication module 190 may use several protocols in order to communicate with a server computer 14-18, such as IPv4, IPv6, TCP, UDP, ODBC, HTTP, WebDAV, SSH, IMAP and even define its own specific communication protocol. The data elements management module 186 may also be used in conjunction with an email connectivity module 194 and network communication module 190 in order to treat and represent emails in the same way as the data elements of a database 32. The data elements management module 186 may also be used in conjunction with the permissions module 198 (on the client or server side) in order to control the user access to elements based by some sort of sharing rules. The data elements management module 186 may also work in conjunction with a caches module 202, providing client-side cached versions of the database 32 and files in order to respond to future requests faster. Modules 174 may be made to communicate information in a standardized way by the use of an Application Programming Interface (API) in order to simplify the data elements management module's 186 interactions with other modules 174.

The data elements management module 186 may sort through documents 200 stored in the database 32 and connected to each other via a variety of referencing modes, may apply a filter as specified in a query 230 and may subsequently direct the filtered documents 200 to other modules 174 (this will be shown in FIG. 6). One such module may be an axis-ordering module 206 which may distribute documents 200 filtered by the data elements management module 186 onto an axis-like array 288 or axis 292 (illustrated in FIG. 6) according to a collation function 300 that may be user- or system-specified and analyzed by the computing module 178. An axis 292 or axis-like array 288 is an embodiment of graphical rendering of the functionalities described in the present specification on a device's display 150 that can be embodied as a substantially rectilinear sequence of documents 200 from which a viewer can infer meaning and/or relationships therebetween. An axial distribution 292 of documents 200 is adapted to accommodate and display a single type of documents 200 or, if desirable, more than one type of documents 200, computer files, multimedia contents, user-selectable elements and/or user-selectable menu elements. Generally, an axis 292 is used to graphically group information elements 200 having a commonality. Other functionalities related to axes 292 shall be described in greater detail below.

The axis-ordering module 206 may manage the ordering of single documents 200 and/or several documents 200 assembled into document sets 220 onto one or more axes 292. In addition of managing the collation of documents 200 onto an axis 292, the axis-ordering module 206 may also manage the order of the documents 200 contained within secondary document sets 224 (not illustrated). The positioning module 210 manages the positioning of documents 200 within axes 240 based on interactions with other modules 174 processing the various elements contained in a query 230. The positioning module 210 is adapted to and may interpret data contained in document sets 224 generated by the data elements management module 186 in relationship to the query 230 to identify a location for a given document set 228 within the collation of an axis 292. Likewise, a visually distinctive features management module 214 is adapted to interpret data contained in documents 200 or document sets 224 generated by the data elements management module 186 in relationship to the query 230 to selectively apply one or more visually distinctive features 284 (not illustrated in this figure) to single documents 200 or document sets 224. Finally, a display management module 218 may, inter alia, manage elements related to the user interface 234, possibly interacting with a graphics card and a monitor 147. The display management module 218 may use a document-rendering module 222 that provides instructions to render specific documents 200, like images, text files, word-processing files, spreadsheet files, presentation files, etc. The document-rendering module 222 may also provide an API to allow developers add their own extensions to provide renderers for other document types.

Figure 5:
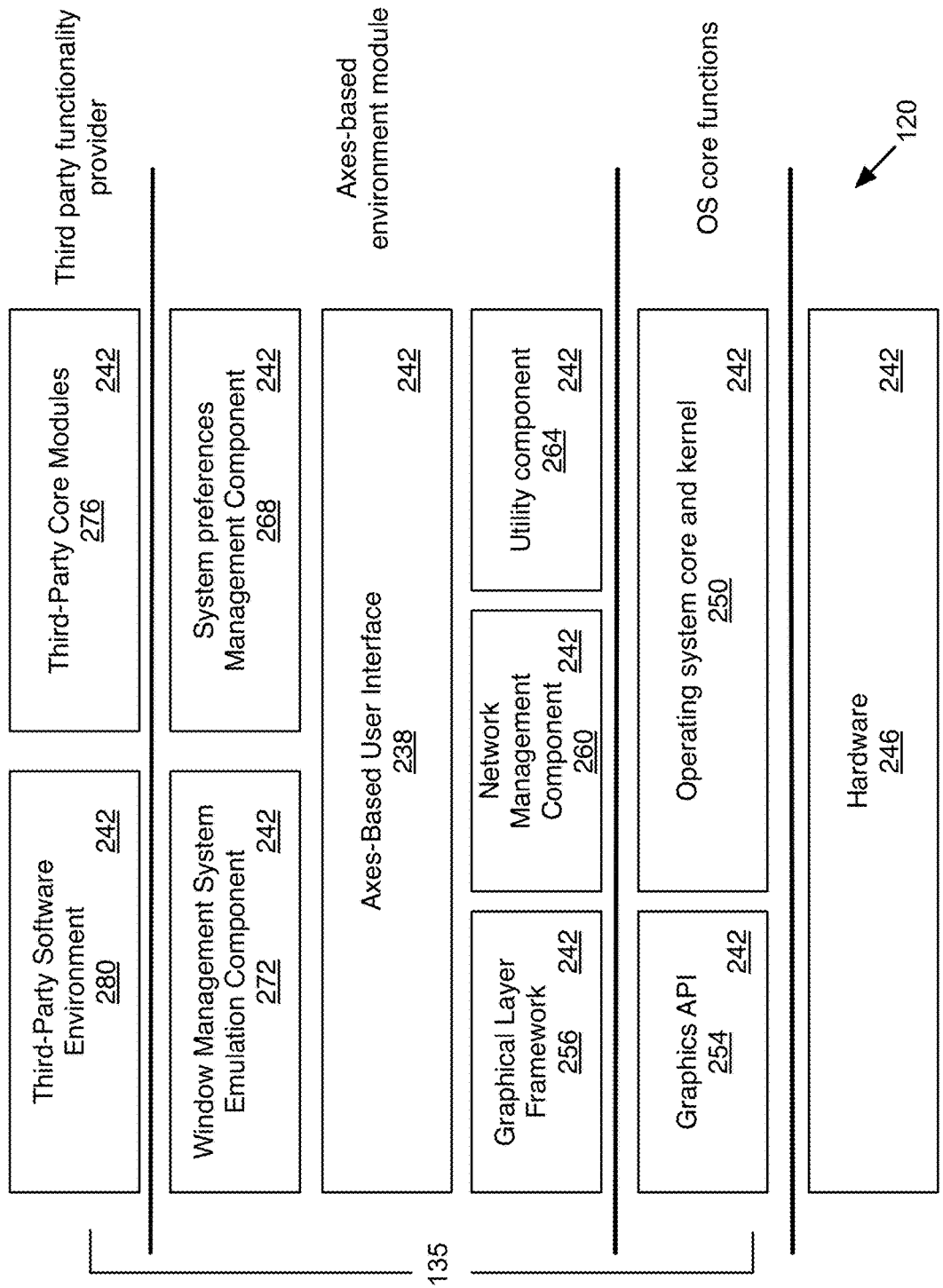
FIG. 5 is a schematic illustration of an axis-based interface and operating system.

FIG. 5 depicts a computer system 120 comprising an operating system 135 with an integrated axis-based user interface 238. As illustrated in FIG. 5, the axis-based user interface 238 could serve as a desktop environment to manipulate documents 200 (such as files, objects and applications), or could be used as a main operating system 135 user interface 234. One can appreciate a hierarchical description of a computer system 120 and software system 170 with multiple components 242. First, hardware 246 is used to provide users with a physical device 34-48. Second, the axis-based system could be built on top of an existing operating system core and kernel 250, such as, for instance, Unix™ or BSD™. A graphics API 254 like OpenGL® could also be used in order to provide basic graphical capabilities to the system via a video adapter 148.

Multiple core functionalities could be integrated to provide core operating system 135 services. A graphical layer framework component 256 could be built over the graphics API component 254, and could be used to provide complex drawing capabilities. The layer-based graphics layer framework component 256 may also supports widgets rendering and handling (like buttons, text fields, dialogs, etc.) A network management component 260 could be based on pre-existing network management capabilities in the operating system core and kernel 250. It could serve as a tool to manage an Internet network connection through Ethernet, Bluetooth, Wi-Fi, Modem and other communication channels. A utility component 264 could handle all the other services needed to communicate with the operating system core and kernel 250, providing functionalities such as user login, user authentication, memory, disk-access management, etc. Using these modules, the axis-based user interface 238 would use core functionalities from the graphical layer framework component 256, the network management component 260 and the utility component 264 to provide workspaces 306 comprising multiple axes 292 or groups of axes 310 that display documents 200 (not shown in FIG. 5). The axis-based user interface 238 may also provide more integrated actions, like interface buttons, preview or magnification that may be directly docketed. Another component, a system preferences management component 268, would provide multiple functions needed by the axis-based user interface 238, such as dialogs to manage document insertion, attribute definitions, users, permissions, application configuration, etc. Finally, the operating system 135 may comprise a window management system emulation module 272. This module may be based on an X Window System or X11© and may use other existing client application libraries to provide a large number of applications as well as functionalities to run windowed applications on top of the axis-based user interface 238. To provide other functionalities, third-party application providers could build third-party core modules 276 on top of the axis-based user interface 238 and system preferences management module 268. Third-party application providers could also develop third-party software environments 280 and other applications that could be run using the window management system emulation 272, providing the user with useful applications such as an Internet Browser, Office Business Applications, Multimedia Applications, Games, etc.

The Window Management System Emulation 272 could also provide functions to provide a more axis-based user interface 238 integration, such as reviews, player and editors for the documents 200 displayed in the axis-based user interface 238. For example, a rich text document 200 could use a third-party module 276 or third-party software environment 280 to provide a previewer or media player for the document 200, or a third-party application to integrate a live editor on the axis-based user interface 238.

This computer system 120 could be used, for instance, as a business solution to provide users with an axis-based user interface 238 operating system 135 directly on multiple kinds of devices 34-48 (computers, laptop, tablets, cell phones, etc.). The computer system 120 may also illustratively be used as a business solution to sell preconfigured devices 34-48 with the axis-based user interface 284. Since the operating system 135 has a built-in axis-based user interface 284, the device 34-48 is likely to have a display 150 and other input devices like a keyboard 140, a mouse 142 or a touch-screen interface. The devices 34-48 may not necessarily provide such parts and may be adapted to be used by communicating information about the user interface 240 and input methods with other devices 34-48 (television set, motion sensing input device, computer or tablet over network, cell phone, etc.)

Figure 6:
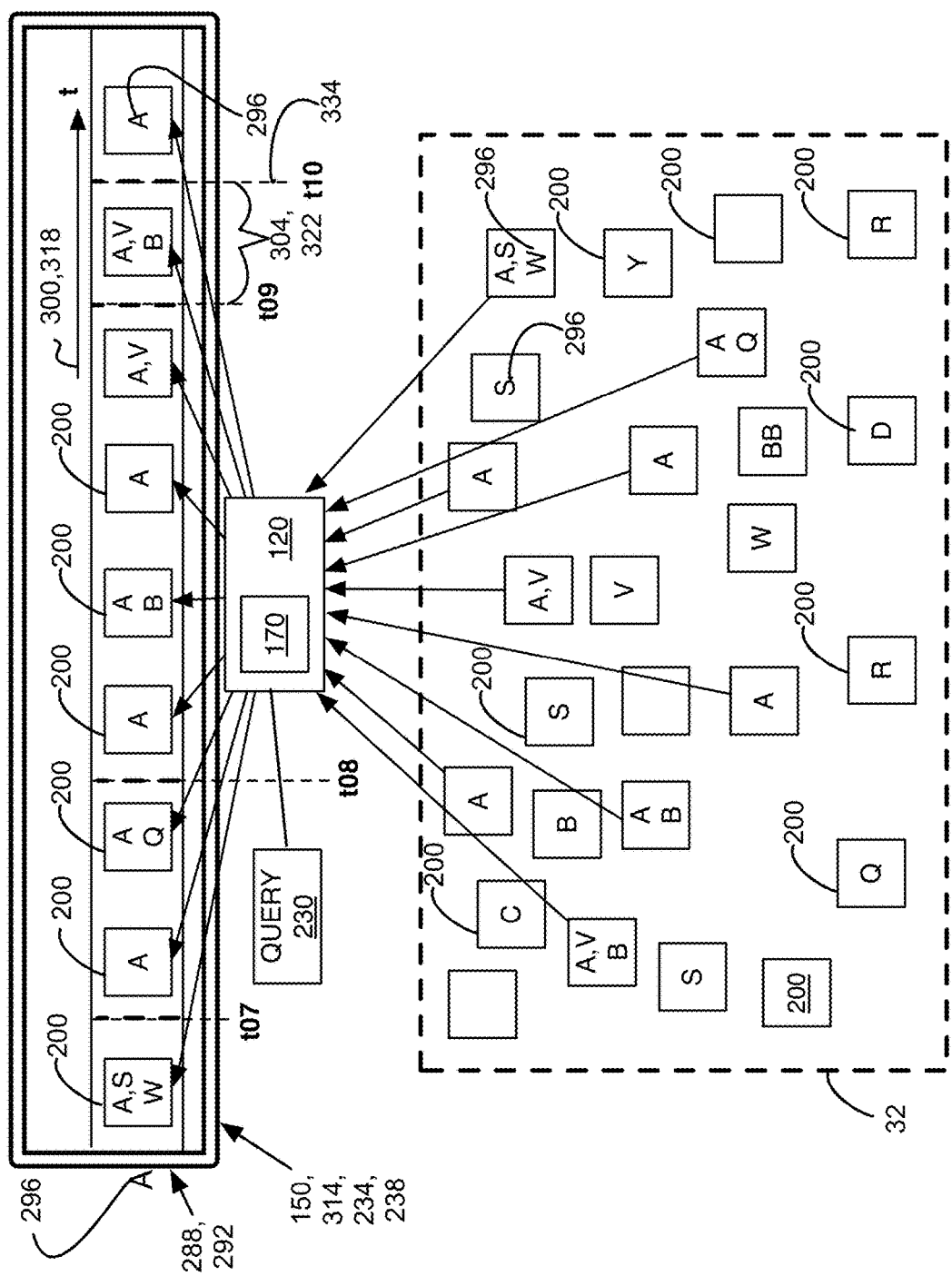
FIG. 6 is a schematic illustration of an exemplary axis layout.

FIG. 6 illustrates the interaction of the computer system 120 and software system 170 with an axis-based graphical user interface 238. An interface program providing a graphical user interface 234 for managing information elements 200 in accordance with an embodiment of the invention are installed on a machine, e.g. a computer system 120 as illustrated in FIG. 3. The interface 234 can be programmed using various programming languages e.g. C++, Java or other suitable programming languages. The programming of these languages is well known in the art and is adapted to be stored on a machine-readable medium and readable therefrom to provide executable instructions to a hardware system. It is believed that a skilled reader in software art is going to recognize this portion of the system that will, therefore, not be further described herein.

The graphical user interface 234 may run through the operating system 135 and the hardware 246 of the computer system 120 or, alternatively, through a network-based system e.g. client-server, and cloud computing system as exemplified in FIG. 1 and FIG. 2. The interface 234 is adapted to display and manage information elements 200, generally provided on a basis of a query 230, which may be stored in one or many databases 32 (as illustrated in FIG. 6) that might be distributed in a combination of locations (e.g. multiple databases, web, cloud, etc.). Information elements 200 may include computer files, pictures, multimedia content, applications (i.e. computer programs), menu elements, sets of icons and/or other user-selectable elements, all of which shall henceforth be indiscriminately referred to as documents 200 to lighten the text without limiting the scope of the present invention.

An axis-based graphical interface 238 is adapted to graphically structure documents 200 in arrays 288 that arrange the documents 200 in rows and/or columns in a reasonably regular fashion and to allow navigation thereof by the user further to a query 230. The axis-based layout and ordering provide the user with information about the content of each document 200, its meaning and its relationships to the other documents 200 disposed on the axis 292. Navigation tools are provided with the axis-based user interface 238 to allow navigation through the documents 200 of a single axis 292 and of various axes 292 when a plurality of axes 292 is enabled. The display of documents 200 on an array 288, or axis 292, therefore allows contextual management of documents 200 as a flow, or as an ongoing rational sequence of documents 200. An axis-based interface 238 thus helps to intuitively display a group of documents 200 and facilitate the understanding and managing of large sequences of documents 200 bearing a relation.

In a simplified exemplary form, an array 288 may be embodied as an axis of documents 292 (hereinbelow referred to as axis 292 to lighten the text), which groups documents 200 in a single row or column, as illustrated in FIG. 6. An axis 292 can be embodied as a substantially rectilinear arrangement of documents 200 adapted to dispose each document 200 on a straight or curved line. The axis 292 can be embodied as completely straight (rectilinear), slightly curved, substantially curved, circular, angled, following a particular shape or have a consistent shape over which documents 200 are disposed in a reasonably consistent fashion. The exact shape of the axis 292 can vary as well as its disposition—horizontal, vertical or other—in relation to the device's display 150. inter alia, is that the layout The structure of an axis 292 provides a sequence of documents 200 from which a viewer can infer meaning, logical connections, contextual location, and/or relationships.

The axis 292 can be represented as a single axis 292, a double axis 292, or as more axes 292. Axes 292 may be independent from one another (using distinct scales, or orderings, henceforth referred to as collation functions 300) or may form a group of axes 310 by sharing the same scale or collation function 300. Also, a document 200, attribute 296 or other property of an element contained in an axis 292 can be selected and used as a logical connector to create an additional axis 292 from an existing axis 292. This subsidiary axis 294 is meant to be temporary in some embodiments, serving as a way to view a specific set of additional documents 200 or highlight certain documents 200 from the original axis 292 without having to alter the entire workspace 306. It may originate from the logical connector document 200 or information element 200 and be disposed in a non-parallel fashion thereto. The subsidiary axis's 294 position is preferably orthogonal to the original axis 292 but the angle may vary. Like axes 292, logically connected axes 294 may be scrollable. More such logically connected axes 2924 can subsequently be created in the same fashion. This is what could be called "relational navigation".

Axes 292 may be disposed horizontally and/or vertically. Groups of axes 310 may be presented by using one of the layouts or by combining both of them. Axes 292 presented in the embodiments below are generally illustrated in the horizontal layout configuration. However, they could, all or in majority, be disposed vertically without departing from the scope of the present disclosure. Other possible graphical layouts of documents 200 might become obvious to a skilled reader in light of the present application and would be considered within the scope of this application.

When only a portion of the axis 292 is visible, a play of zoom, pan and scrolling movements along the axis 292 allows a user to navigate the axis 292 and change the series of documents 200 that is displayed in a display area 314 of the display 150. Scrolling movements can be performed in a variety of ways including but not limited to click-and-drag, pressing on the keys of a keyboard, gesturing to a motion-sensor or on a touch-screen.

Documents 200 might overlap or decrease in size so as to fit or maximize the space available in the display area 314. Selected documents 200 on an axis 292 can be magnified to increase the level of detail shown. Similarly, a small display area 314 could display only one document 200 out of the entire axis 292. The remaining documents 200 would not be displayed in the display area 314 but would yet remain at their respective "virtual" position on the axis 292, ready to be displayed upon scrolling the axis 292. In other words, if we consider a mobile platform like a mobile phone having a small display 150, the small display 150 might only allow to efficiently display one document 200 at a time. However, the displayed document 200 being part of an axis 292, the other documents 200 on the axis 292 would remain displayable in accordance with their respective position on the axis 292 when the axis is scrolled, navigated, gestured.

The documents 200 are selected to be disposed on the axis 292 on the basis of one or more attributes 296, and are ordered thereon according to a collation function 300, namely an ordered arrangement made by comparison, (e.g. a chronological order adapted to use a time scale 318. The attribute(s) and collation function 300 parameters are specified in a query 230 that may be run by a user or by an automated function of the system. Indeed, each axis 292 groups documents 200 in accordance with, for example, a selected tag, category, keyword, document creator, or other attribute 296 that expresses a characterization of one or more document(s) 200 and that are configurable to represent intrinsic or extrinsic characteristics. The term "attribute" 296 will generally be used throughout the instant specification to lighten the reading of the text and will encompass other document properties or means for establishing commonality or relationships as described above unless otherwise specified.

Attributes 296 may be user-specified or system-specified. Generally, documents 200 bear a plurality of attributes 296 assigned by one or more user(s) (e.g. keyword, subject, project, creator, category, etc.), and a plurality of attributes 296 that are assigned by the system, such as, illustratively, file type, time of creation, number of views, time of last modification, file size, etc. Given the broad range of applicability of the present invention, the attributes 296 that may be assigned by the system and user, as well as the attributes 296 that can be desirable to use in the management of axes 292 might substantially vary from one field or user to another and however remain within the scope of present specification.

The selection of one or more attributes 296 (using Boolean logic for instance) in a query 230 determines which documents 200 will be displayed on the axis 292. If no specific attribute 296 is selected, the axis 292 will display all documents 200 in a default order, like the date of creation thereof. Thus, all documents 200 on the same axis 292 are normally associated with the selected set or combination of attributes 296 that are used as parameters for the axis 292. Third-party data, like publicity or user-targeted information, could also be added to an axis 292, either arbitrarily or according to user information, filtering and/or existing collation of axes 292 without departing from the scope of the present invention.

The documents 200 illustrated in FIG. 6 feature attributes 296 individually represented by a capital letter thereon, or none, in which case the documents 200 are left blank. Letter attributes 296 are used in the present application for illustrative purposes only: while letter attributes are theoretically possible, more descriptive attributes 296 such as those described above are used in embodiments of the present invention. As is shown in FIG. 6, any document 200 can simultaneously feature multiple attributes 296, some user-specified and others system-specified. In fact, a preferred embodiment of the invention assigns a plurality of attributes 296 to every document 200. Other documents 200 illustrated on FIG. 6 are blank, or without any associated attribute 296, illustrating documents that could theoretically not be assigned any attribute 296, but that could nonetheless be created and found in a query 230 (e.g. a query 230 that would select all documents 200 contained in the database 32).

The query 230 in FIG. 6 here illustratively filters and selects documents 200 from the database 32 based on attribute 296 'A' for display on the axis 292. FIG. 6 further illustrates that the documents 200 selected from the database 32 by the query 230 are placed on the axis 292 in chronological order 318, another parameter that could be specified in the query 230. Indeed, an axis 292 also generally disposes the documents 200 resulting from the query 230 in accordance with a specified order or collation function 300, (e.g. chronological order, alphabetical order, statistical order, increasing file size, etc.). A collation function 300 might include dividing the axis 292 into successive collation units 304 (e.g. time units 322 in the case of a chronological order, which can illustratively be hours, days, months, years, etc.). A collation function 300 would thus dispose each document 200 along the axis 292 according to the value of a specified attribute 296 in relation to the collation units 304 of the axis 292 and the other documents 200 of the selected document set 228. Among collation functions 300, a chronological distribution of documents 200 on a time scale 318 is used in most embodiments of our work because of its intuitiveness (because any action or event takes place at a specific time and usually in sequence with other events or actions). While an axis 292 disposing documents in random fashion is also contemplated within the scope of the present specification, axes 292 disposing documents 200 according to a collation function 300 are illustrated embodiments because of the usefulness of ordering documents 200.

Figure 7:
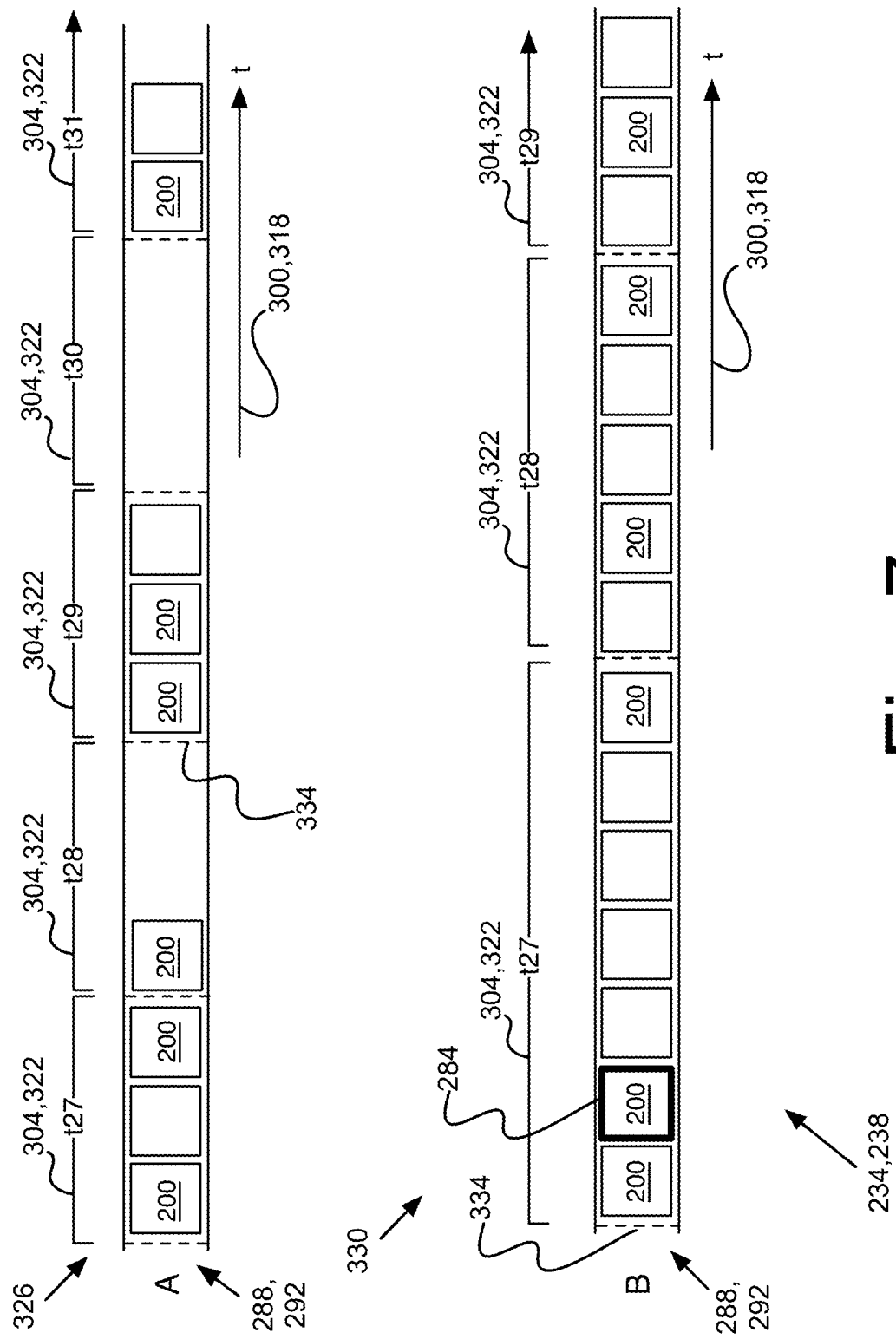
FIG. 7 is a schematic illustration of a linear and non-linear axis configurations.

An axis 292 or a group of axes 310 may be embodied in a linear configuration 326 or a non-linear configuration 330. Both configurations are illustrated in FIG. 7 in a generic example. As can be appreciated from FIG. 7, a linear configuration 326 displays collation units 304 of the same graphical longitudinal size regardless of the number of documents 200 contained in each collation unit 304. The size of the documents 200 located within a given collation unit 304 can optionally be adjusted in accordance with the number of documents 200 located therein. For instance, documents 200 will be larger if there are few documents 200 in the collation unit 304 and smaller if many documents 200 are found therein. Alternatively, the documents 200 can remain of the same size and can overlap or be stacked when their quantity exceeds the available space. Another possible way of making large numbers of documents 200 fit into a fixed-size collation unit 304 is to equip the collation unit 304 with a scroll bar allowing the user to navigate the collation unit 304 to reveal hidden documents 200. This also means that documents 200, in a linear configuration 326, may be displayed as an uneven sequence from a graphical point of view. Ultimately, a collation unit 304 in a linear configuration containing no document will appear as empty, or as a blank space on the display 150, but will still be the same size as the other collation units 304 of the axis 292.

Conversely, the non-linear configuration 330 displays collation units 304 of uneven longitudinal sizes because an even distribution of documents 200 along the axis 292 prevails over the linearity of the collation. In other words, document 200 size and a constant flow of documents 200 along the axis 292 are given primacy over having collation units 304 of equal graphical size. This provides a more efficient use of the space on the axes 292 but may provide less meaning to illustrate an evolution along time.

Figure 8:
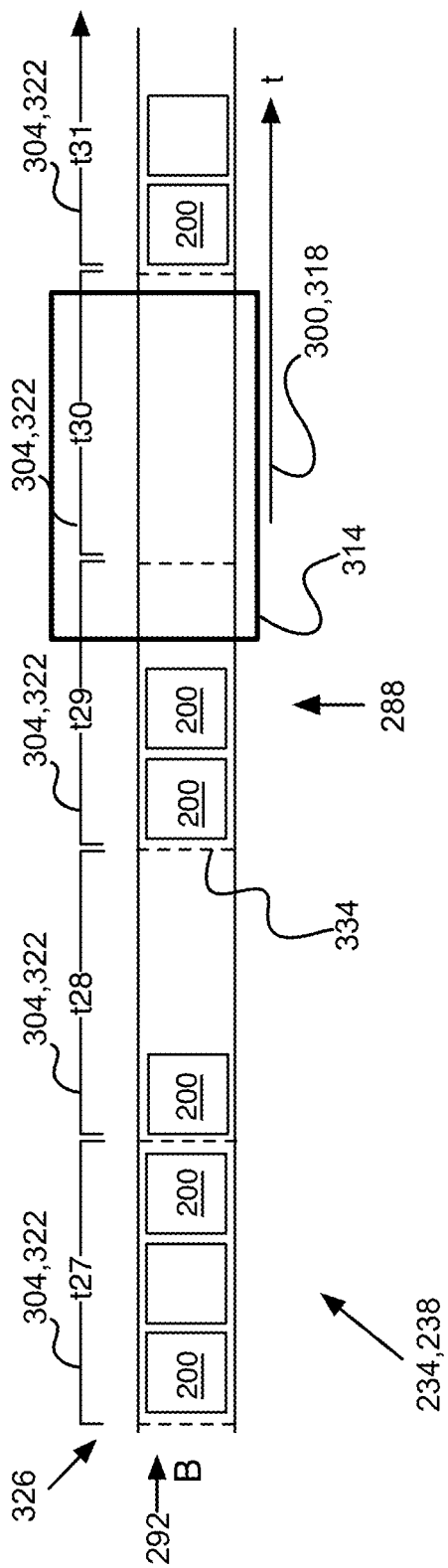
FIG. 8 is a schematic illustration of an exemplary axis layout in accordance with an embodiment of the present invention.

Turning now to FIG. 8, an axis-based graphical user interface 238 displaying an exemplary axis 292 with a schematic display area 314 thereon is illustrated. The axis 292 places a host of documents 200 in chronological order along a time scale 318. The time scale 318 divides the longitudinal side of the axis 292 into time units 322. Documents 200 are placed therein according to, illustratively, the time of their creation or other time-related attribute 296 ascribed thereto by the system or by the user.

The axis 292 depicted in FIG. 8 features a linear configuration 326, meaning that all time units 322 will be of equal graphical size regardless of the number of documents 200 contained in each one. A non-linear configuration 330 could have been used in the example of FIG. 8 without departing from the scope of the present invention. As is illustrated in FIG. 8, some time units 322 are filled with documents 200, while others containing few documents 200 could have blank space therein and yet other time units 322 containing no documents 200 could be completely empty. This can result in a total absence of documents 200 in a display area 314 even when documents 200 are located in other sections of the axis 292 outside the display area 314 on the display 150. This is illustrated in FIG. 8 where the display area 314 showing parts of time units 322 "t28" and "t29" is devoid of any documents 200. This can happen, illustratively, after an axis 292 is created further to a query 230 and the portion of the axis 292 initially displayed in the display area 314 is empty or, alternatively, as a result of scrolling of the axis 292 to an area where it is empty. As explained above, a document-less display area 314 can be confusing to a user and, if it is too large for scrolling to be an efficient way to find and reach the next documents 200.

Figure 9:
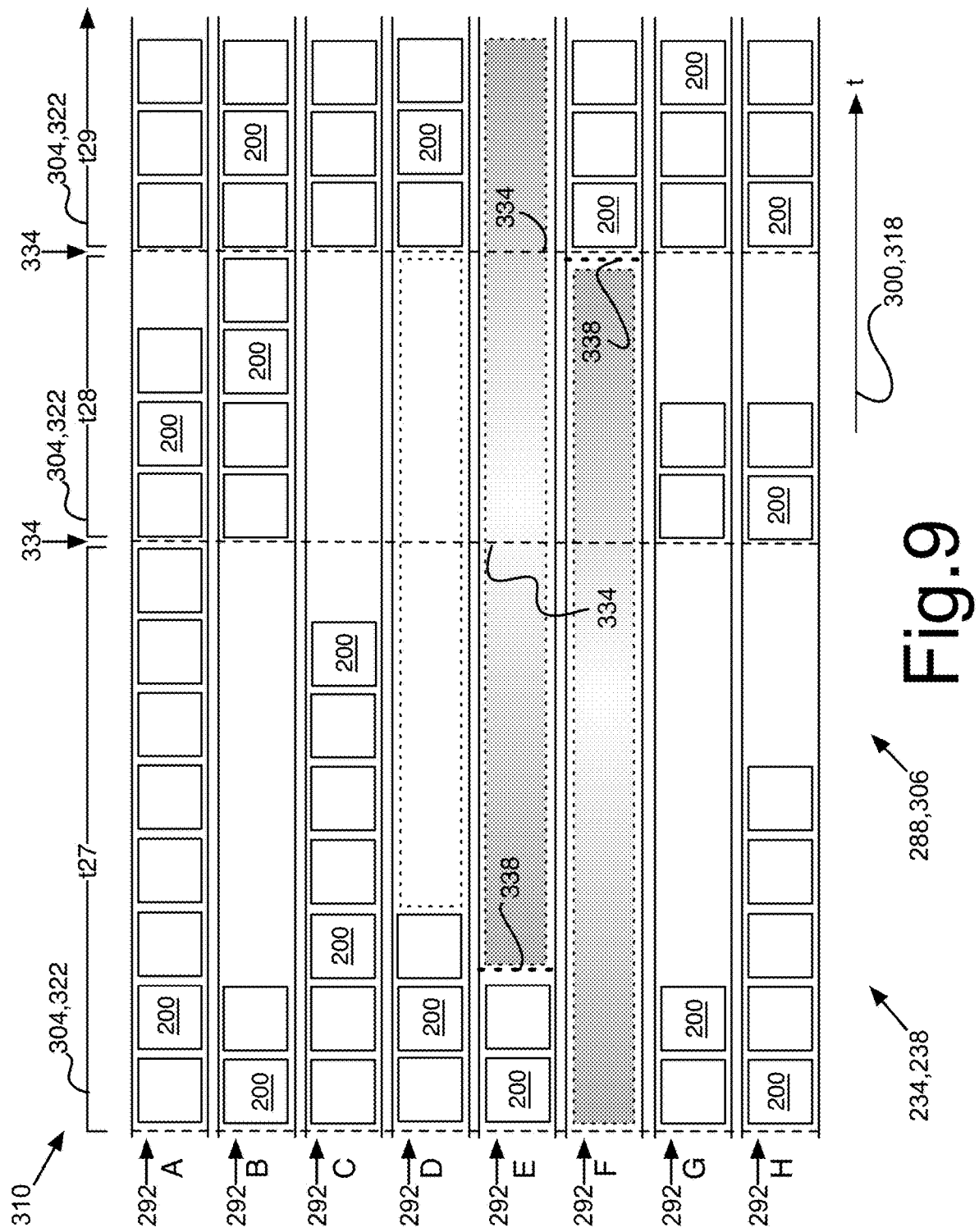
FIG. 9 is a schematic illustration of an exemplary axes layout in accordance with an embodiment of the present invention.

On FIG. 9, an exemplary illustrative axis-based workspace 306 including a plurality of axes 292 sequentially identified with capital letters (A to H) and each including a number of documents 200 thereon is illustrated. When more than one axis 292 is represented, the present description is going to refer to this plurality of axes 292 as a "group of axes 310" in order to facilitate reading of the present specification and conceptualization of the embodiments. Also, while the group of axes 310 illustrated in FIG. 9 and subsequent figures depict horizontal axes 292, the group of axes 310 could alternatively be disposed vertically in other embodiments. The group of axes 310 features a shared collation function 300, meaning that axes 292 can only be scrolled collectively. The scrolling of any single axis 292 will result in a corresponding shift of all other axes 292 of the group of axes 310. In this case the collation function 300 is a chronological order represented by a time scale 318 composed of time units 322.

To illustrate that time units 322 may represent any duration, the axes 292 of FIG. 9 have time units 322 labeled with a 't' and followed by successive numbers. Time unit markers 334 represent time units 322. Because all the axes 292 in the group of axes 310 share the time scale 318, each time unit 322 is represented at the same longitudinal location on each axis 292 and a time unit 322 length is shared by all axes 292 of the group of axes 310.

End markers 338, illustrated in FIG. 9 as a dotted line thicker than the one used for time unit markers 334, mark the first and last documents 200 in one direction of an axis 292. For instance, an end marker 338 placed to the right of the two documents 200 on the left-hand side of axis 292 'E' indicates to the user that the two documents 200 are the last two located in this direction of axis 292 'E'. Conversely, the end marker 338 displayed to the left of the three documents 200 on the right-hand side of axis 292 'F' indicates that these three documents 200 are the first ones on axis 292 'F' and that no additional documents 200 are located to the left of end marker 338.

Unlike in FIG. 8 where a linear axis configuration 326 is illustrated, FIG. 9 shows a non-linear axis configuration 330 shared by all the exes 292 of the group of axes 310. As was explained above, a non-linear configuration 330 determines the size of each collation unit 304 based on the number of documents 200 contained in each one rather than on a constant time unit 334 size. When only one axis 292 is displayed (not shown), a non-linear configuration 330 results in collation units 304 that are completely full of documents 200 with substantially equal intervening spaces therebetween. However, when several axes 292 are brought together to form a group of axes 310 sharing a unique collation—such as in FIG. 9—the size of each collation unit 304 is determined by the largest number of documents 200 contained in that collation unit 304 on any of the axes 292. By way of illustration, time unit 322 't27' in FIG. 9 is the same size on every axis 292 in the group of axes 310, as determined by the number of documents 200 in that time unit 322 on axis 292 'A' since axis 292 'A' is the axis 292 on which time unit 322 't27' has the most documents 200. Similarly, the size of time unit 322 't28' is determined by the number of documents 200 in that time unit 322 on axis 292 'B' since it is the axis 292 on which the most documents 200 are found in time unit 322 't28'. And so on and so forth with every time unit 322. Other embodiments using a different distribution of documents 200 in axes 292 of a group of axes 310 or in a plurality of groups of axes 310 are subjected to the same rationale and encompassed by the present specification.

An alternate embodiment could determine the size of each collation unit 304 according to an entire axis 292 which would be used as reference for all collation units 304. In other words, the documents 200 found on the axis 292 chosen (by default of by the user) to act, as reference would guide the size of all collation units 304. That axis 292 would thus present a continuous flow of documents 200 in full collation units 304. Meanwhile, the other axes 292 in the group of axes 310 may present collation units 304 that are partially or completely empty as well as collation units 304 that are over-full with documents 200. Collation units 304 containing more documents 200 than are found in the reference axis 292 for that same collation unit 304 could represent large numbers of documents 200 in a variety of ways including but not limited to: adapting the collation unit 304 for navigation with a scroll bar, reducing the size of each document 200 in order to have each one represented and user-selectable in the collation unit 304, and making documents 200 overlap so as to make them fit into the space defined by the collation unit 304. In this last mode of representation, individual documents 200 may, for instance, become visible and user-selectable as a subsidiary axis 294 upon selection of the document stack by the user.

As a result of either of these processes, some of the axes 292 may display collation units 304 (in this case time units 322) containing blank or document-less space.

Figure 10:
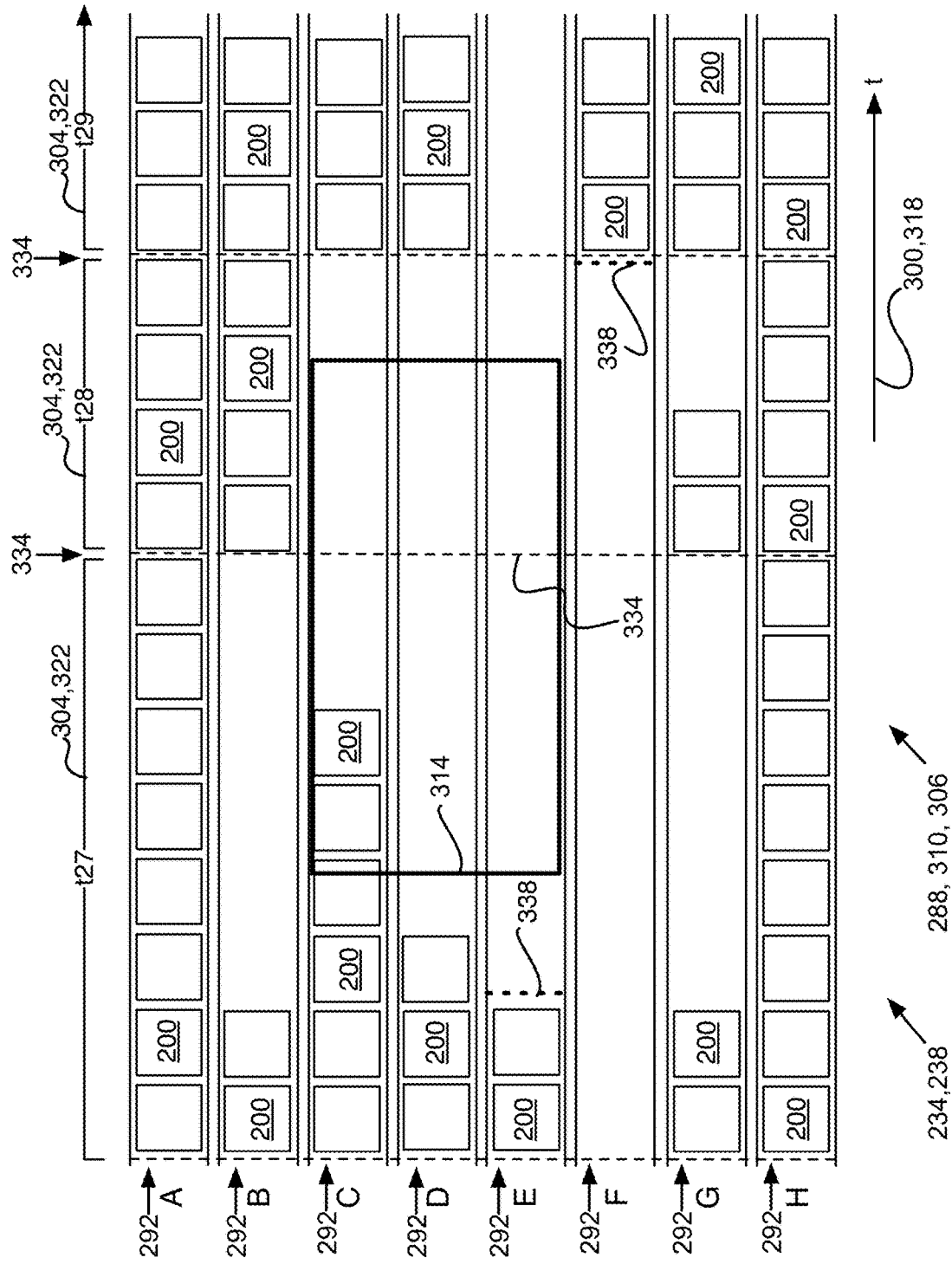
FIG. 10 is a schematic illustration of an exemplary axes layout with a display area thereon in accordance with an embodiment of the present invention.

While a viewer of the group of axes 310 depicted in FIG. 9 can appreciate the full distribution of the documents 200 on the eight (8) axes 292 with this view of the group of axes 310, a different story emerges if the display 150 used to display the group of axes 310 is small or if the interface 234 is zoomed to magnify documents 200 therein. FIG. 10 thus illustrates the same group of axes 310 as in FIG. 9 but with a display area 314 added thereon which defines the visible portion of the workspace 306. The shape and size of the display area 314 may vary and display a varying number of axes 292 and documents. The number of documents 20 and axes 292 displayed within the display area 314 may be based on the zoom level configured. If the zoom level is high, only one axis 292 or part thereof may be displayed. Conversely, if the zoom level is low, several axes 292 may be displayed in the display area 314. In the following figures, many of the display areas 314 illustrated encompass approximately one (1), three (3) or four (4) axes 292. However, any intervening or higher number of axes 292 can theoretically be displayed in a display area 314 if desirable. In turn, the dimensions of the display area 314 may also vary according to the size of displays 150 or to the preferences of a user. For instance, he or she may wish to work with many contiguous or overlapping windows, corresponding to different applications, and therefore increase or reduce the size of the display area for each one. This could result in a smaller or larger number of documents and axes 292 being displayed in the context of this application. In FIG. 10, the display area 314 displays to a viewer only two documents 200 and a portion of a third document 200 out of the large number of documents 200 represented on the eight-axis group of axes 310. One can appreciate from FIG. 10 how limited and unintuitive a user's view of a group of axes 310 and the documents 200 therein can become if one's display area 314 is small or zoomed in.

Figure 11:
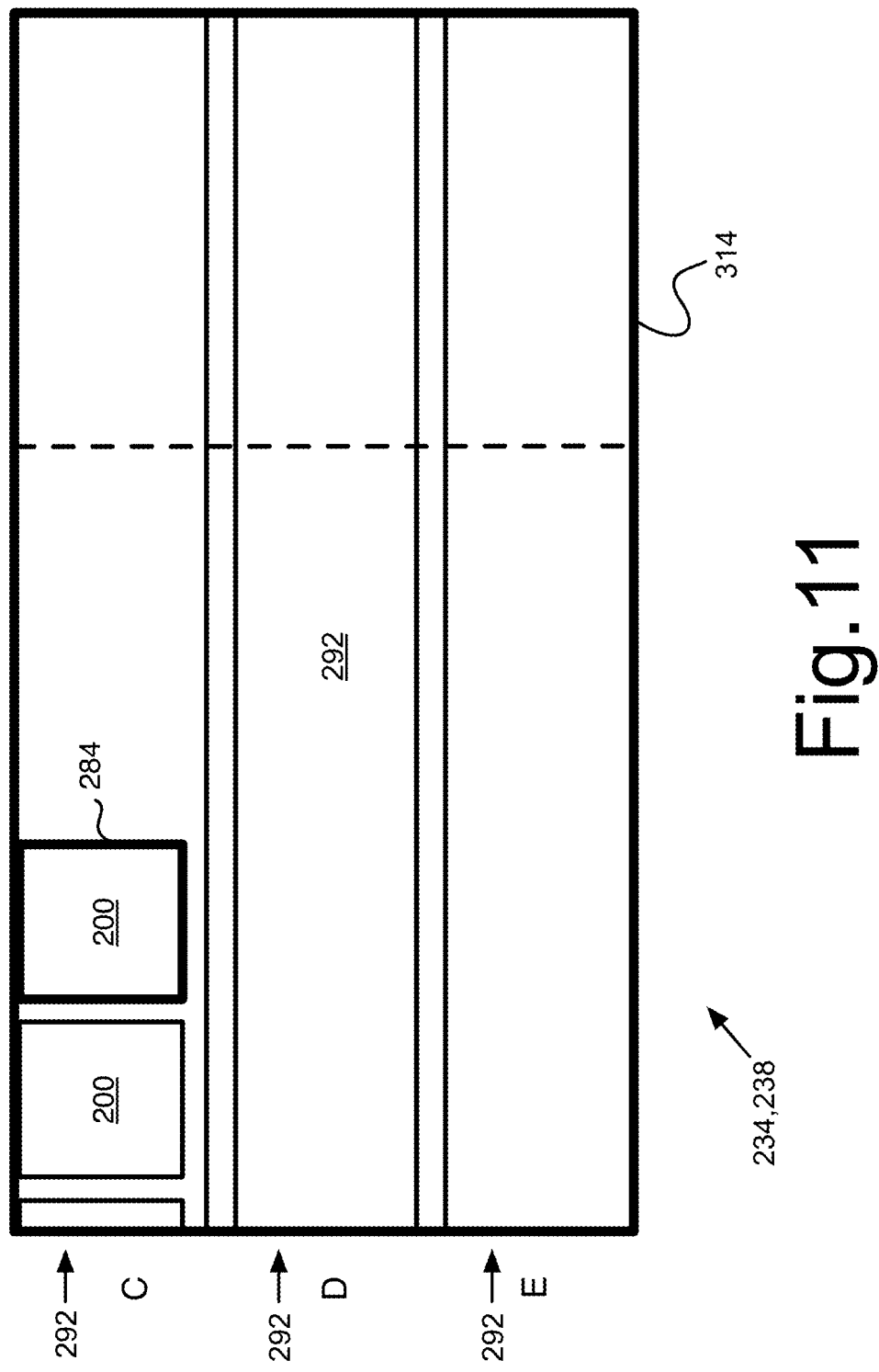
FIG. 11 is a schematic illustration of a magnified display area in accordance with an embodiment of the present invention.

An exemplary magnified view of a display area 314 is illustrated in FIG. 11. In this Figure, the display area 314 is isolated in order to provide the actual point of view a user would have of the axis-based user interface 238 using a small display 150 like, for instance, a mobile phone display. One can appreciate from FIG. 11 that such a magnified view significantly limits what a user can see out of the entire workspace 306 and greatly increases the difficulty in navigating the axes 292 because of uncertainty concerning the presence, number, direction and location of the non-displayed surrounding axes 292 and documents 200. For example, a user looking at this display area 314 could tell little about axis 292 'D'. There are no documents 200 to start from or any indication as to whether there are any documents 200 at all on axis 292 'D'. If there are documents 200 on axis 292 D, those might be distributed on either or both sides of the axis 292 outside the display area 314. Ultimately, axis 292 'D' could be empty axis 292 (providing no results to the query 230 using attribute 'D' for example). Either way, there are no indications informing the user if there are documents 200 he or she can navigate to from one of the two documents 200 visible in the display area 314 and, if so, how far or how many there are. Also, if there are indeed documents 200 disposed on at least one of the longitudinal sides of the axis 292 'D' they might be so far that scrolling to reach them with a mouse and a cursor, or with hand gestures on a touch screen, can become a real burden.

Figure 12:
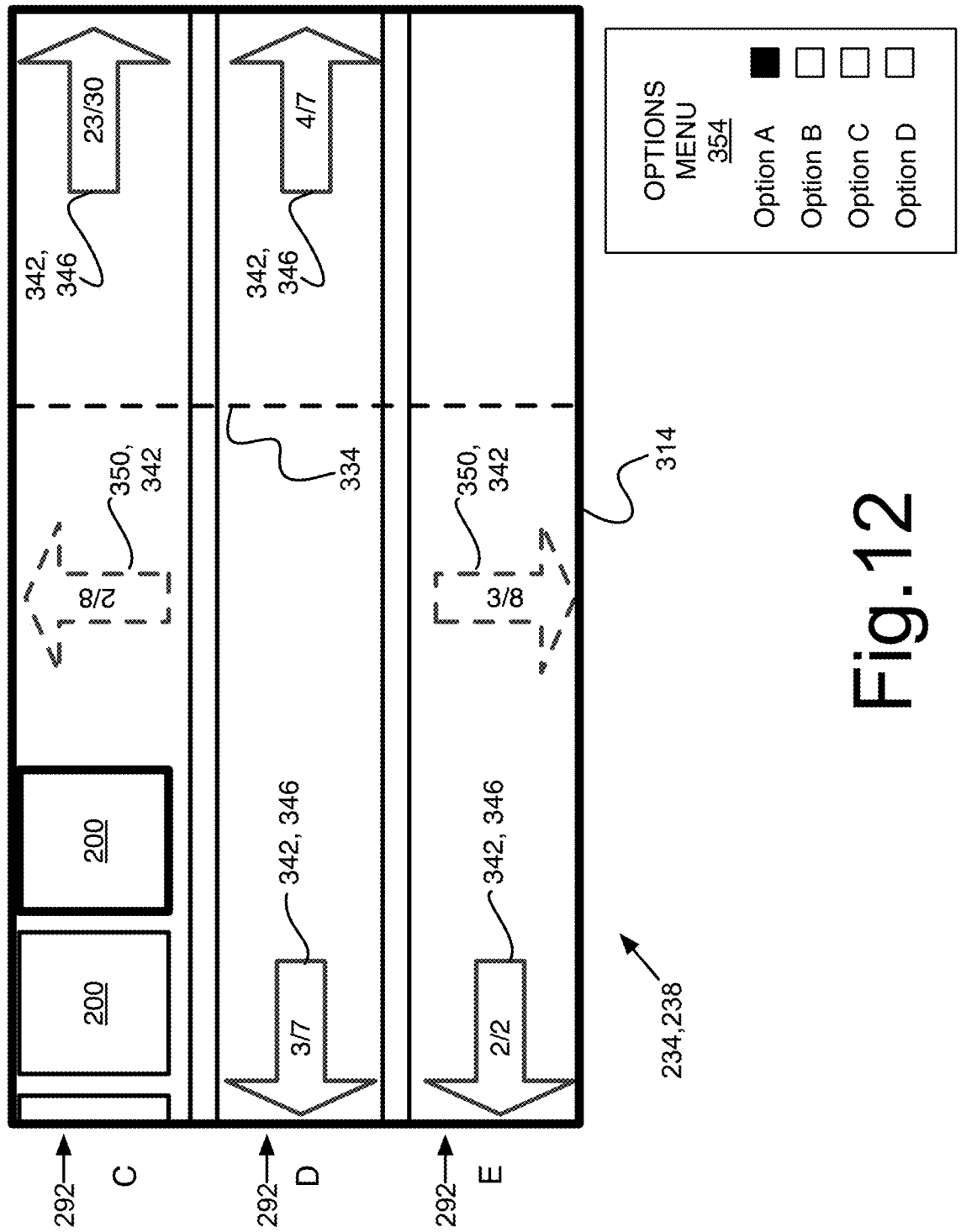
FIG. 12 is a schematic illustration of a magnified display area with navigation means thereon in accordance with an embodiment of the present invention.

FIG. 12 illustrates the same display area 314 as the one illustrated in FIG. 11 with an embodiment using arrows 342 to provide additional information and navigational capabilities related to the surrounding axes 292 and documents 200 thereon. Although the arrow 342 could be embodied differently (e.g. icon, user-selectable element, gestures, navigation control, different shape, color, size, etc.) and offer the same functions and yet remain within the scope of the present invention the term "arrow" 342 will be used in this specification to facilitate the reading of the text. For instance, the arrows 342 can be replaced with, illustratively, a thumbnail of the next available document 200 in the direction the arrow 342 points to. The selection of the next available document 200 would be similar to the selection of the arrow 342 leading to the next document 200. More than one "next" document 200 could also be displayed without departing from the scope of the present invention.

The arrows 342 have various functions in embodiments of the invention. The arrows 342 indicate if there are documents 200 or axes 292 outside the display area 314 in a direction. The arrows 342 may, inter alia, provide information about the number of available documents 200 and allow the user to navigate directly to the next document 200 or axis 292. Arrows 342 are intended to complement rather than replace the axis-scrolling function whereby the user selects an axis 292, for example by clicking and holding, and subsequently navigates it by, illustratively, moving a mouse, gesturing on a touch screen or, alternatively, using the directional keys of a keyboard 140.

Two types of arrows 342 are illustrated in FIG. 12. The first type of arrow 342 is aligned with the longitudinal direction of the axis 292. A longitudinal arrow 346 thus informs about and navigates to documents 200 of the axis 292 that are located outside the display area 314 in the direction it points to. The second type of arrow 342 is orthogonally disposed in relation to the longitudinal direction of the axis 292. Orthogonal arrows 350 inform about and navigate axes 292 partially or entirely located outside the display area 314 whether these axes 292 are independent from those visible in the display area 314 or are part of a group of axes 310.

Additional cues as to the function of a given arrow 342 may be provided, such as in FIG. 12 where the to orthogonal arrows 350 illustrated therein feature dotted line type. Such visual differentiation may be desirable for many reasons, for instance if multiple arrows 342 are provided, if the display 150 of the device 36-48 used makes the direction of the workspace 306 unclear or, as shall be seen in FIG. 13, if an axis layout presents both horizontal and vertical axes 292. In such circumstances, longitudinal arrows 346 that navigate vertical axes 292 or subsidiary axes 294 may be mistaken for orthogonal arrows 350 if all arrows are the same color, especially if the vertical axis 292 is centered with regards to the display area 314. Alternatively, visual cues including but not limited to line type or background color could be used to signal, for example, the actuation of an arrow 342, the active axis 292, or the axis 292 or direction in which documents 200 are located nearest the display area 314.

Still referring to FIG. 12, the portion of axis 292 'C' visible in the display area 314 (in the present situation the display area 314 corresponds to the entire view offered by the display 150, and could otherwise, if desirable, be smaller—in a separate window, for example) illustrates a little more than two documents 200 on the left side and no documents 200 on the right-hand side. A longitudinal arrow 346 however appears on the right, indicating that there are documents 200 on axis 292 'C' in that direction although they are not visible on the display area 314. The longitudinal arrow 346 further indicates that there are twenty-three (23) documents 200 remaining to the left of axis 292 'C' out of a total of thirty (30) documents 200 (numbers provided for illustrative purposes only). Alternatively, the name of the next document 200 or axis 292 can be added to arrows 342 of either type to provide further information to the user. Selecting the arrow 342, 346 disposed to the right of axis 292 'C' will directly lead to the next document 200 to the right thereof as will be discussed in detail below.

Still considering FIG. 12, axis 292 'D' displays no document 200 at all on the available display area 314. A longitudinal arrow 346 is displayed on the left-hand side of the display area 314 and another is displayed on the right-hand side of the display area 314. These longitudinal arrows 346 inform the user that there are documents 200 further to both the left and the right of the display area 314. More precisely, three (3) documents 200 out of a total of seven (7) on the axis 292 remain on axis 292 'D' to the left of the longitudinal arrow 346 located on the left-hand side of the display area 314. In contrast, four (4) documents 200 out of seven (7) remain on axis 292 'D' to the right of the longitudinal arrow 346 located on the right-hand side of the display area 314. Turning now to axis 292 'E', one can appreciate that there are two (2) documents 200 out of a total of two (2) to the left of the display area 314 and no more documents 200 to the right of the display area 314 since no longitudinal arrow 346 is displayed.

Still referring to FIG. 12, two orthogonal arrows 350 are provided on the display area 314. The orthogonal arrow 350 located on the upper portion of the display area 314 informs the user that two axes 292 of a total of eight remain upward of the display area 314. By contrast, the orthogonal arrow 350 located on the lower portion of the display area 314 informs the user that three (3) axes 292 of a total of eight (8) remain downward of the display area 314. Selecting the orthogonal arrow 350 located on the upper portion of the display area 134 is going to move the display area 314 to encompass the adjacent 290 'B' located higher that the current display area 314 (and therefore not visible on FIG. 12).

Following is Table 1 that describes possible functions associated with the arrows 342. The directions of the arrows 342 are described in the context of the preferred embodiment for this specification, namely one in which the majority of axes 292 are substantially horizontally disposed in relation to the display area 314. Other axes layouts are however encompassed by the present description of functions.

The list of functions presented in Table 1 is not necessarily exhaustive and these functions could be embodied in a number of ways. For instance, the different configuration options for direct navigation to display only one or several of the next available documents 200 or axes 292 could be presented to the user as part of a general preferences menu or else be presented as options in a contextual menu 354 made available to the user in response to an action such as, illustratively, right-clicking of an arrow 342. Such a contextual menu 354 is exemplified in FIG. 12. Likewise, the direct navigation function may be configured to instantaneously display the next available document 200 on an axis 292 or to represent a slow or rapid progressive transition from one section of the axis 292 or group of axes 310 to the next. However, other configuration options and formats may become obvious to a skilled reader and would be considered to be within the scope of the present invention.

TABLE 1

| # | Direction of arrow | Axis layout | Effect |
|---|---|---|---|
| 1 | Left | Plurality of independent axes | Direct navigation of the selected axis only, making visible only the next document on the selected axis and positioning it adjacent to the left-hand border of the display area. Other axes visible in the display area remain fixed at their original position. |
| 2 | Right | Plurality of independent axes | Direct navigation of the selected axis only, making visible only the next document on the selected axis and positioning it adjacent to the right-hand border of the display area. Other axes visible in the display area remain fixed at their original position. |
| 3 | Left | Plurality of independent axes | Direct navigation of the selected axis only, making visible as many of the next documents on the selected axis as can fit into the display area, positioning the first of these documents adjacent to the right-hand border of the display area. Other axes visible in the display area remain fixed at their original position. |
| 4 | Right | Plurality of independent axes | Direct navigation of the selected axis only, making visible as many of the next documents on the selected axis as can fit into the display area, positioning the first of these documents adjacent to the left side of the display area. Other axes visible in the display area remain fixed at their original position. |
| 5 | Left | Plurality of axes grouped into a single group | Collective direct navigation of all grouped axes, the position of the display area being determined by the documents on the selected axis and only making visible the first document reached and positioning it adjacent to the left-hand border of the display area. |
| 6 | Right | Plurality of axes grouped into a single group | Collective direct navigation of all grouped axes, the position of the display area being determined by the documents on the selected axis and only making visible the first document reached and positioning it adjacent to the right-hand border of the display area. |
| 7 | Left | Plurality of axes grouped into a single group | Collective direct navigation of all grouped axes, the position of the display area being determined by the documents of the selected axis and making visible as many of the next available documents as can fit into the display area and positioning the first of these documents adjacent to the right-hand border of the display area. |
| 8 | Right | Plurality of axes grouped into a single group | Collective direct navigation of all grouped axes, the position of the display area being determined by the documents of the selected axis and making visible as many of the next available documents as can fit into the display area and positioning the first of these documents adjacent to the left-hand border of the display area. |
| 9 | Up | Plurality of independent axes/ axes grouped into a single group | Direct navigation to the first available axis upward of the original display area, positioning it adjacent to the top border of the display area. |
| 10 | Down | Plurality of independent axes/ axes grouped into a single group | Direct navigation to the first available axis downward of the original display area, positioning it adjacent to the bottom border of the display area. |
| 11 | Up | Plurality of independent axes/ axes grouped into a single group | Direct navigation to the first available axis upward of the original display area that will display documents in the re-positioned display area, positioning it adjacent to the top border of the display area. |

TABLE 1-continued

| # | Direction of arrow | Axis layout | Effect |
|---|---|---|---|
| 12 | Down | Plurality of independent axes/ axes grouped into a single group | Direct navigation to the first available axis downward of the original display area that will display documents in the re-positioned display area, positioning it adjacent to the bottom border of the display area. |
| 13 | Up | Plurality of independent axes/ axes grouped into a single group | Direct navigation to the next available axes upward of the original display area, displaying as many of these axes as can fit into the display area and positioning the first available axis adjacent to the bottom border of the display area. |
| 14 | Down | Plurality of independent axes/ axes grouped into a single group | Direct navigation to the next available axes downward the original display area, displaying as many of these axes as can fit into the display area and positioning the first available axis adjacent to the top border of the display area. |
| 15 | Up | Plurality of independent axes/ axes grouped into a single group | Direct navigation to the farthermost axis upward the original display area, positioning the farthermost axis adjacent to the top border of the display area. |
| 16 | Down | Plurality of independent axes/ axes grouped into a single group | Direct navigation to the farthermost axis downward the original display area, positioning the farthermost axis adjacent to the bottom border of the display area. |
| 17 | Up | Plurality of groups of axes | Direct navigation to the first available group of axes upward of the original display area, positioning the first available axis of the next group adjacent to the bottom border of the display area. |
| 18 | Down | Plurality of groups of axes | Direct navigation to the first available group of axes downward of the original display area, positioning the first available axis of the next group adjacent to the top border of the display area. |
| 19 | Up | Plurality of groups of axes | Direct navigation to the first available group of axes upward of the original display area, displaying as many of the next available axes as can fit into the display area and including the first one of the group, positioning it adjacent to the bottom border of the display area. |
| 20 | Down | Plurality of groups of axes | Direct navigation to the first available group of axes downward of the original display area, displaying as many of the next available axes as can fit into the display area and including the first one of the group, positioning it adjacent to the top border of the display area. |
| 21 | Up | Plurality of groups of axes | Direct navigation to the first available group of axes upward of the original display area, positioning the display area in the middle of the group of axes. |
| 22 | Down | Plurality of groups of axes | Direct navigation to the first available group of axes downward of the original display area, positioning the display area in the middle of the group of axes. |
| 23 | Up | Plurality of groups of axes | Direct navigation to the first available group of axes upward of the original display area, positioning the farthermost axis of the group adjacent to the top border of the display area. |
| 24 | Down | Plurality of groups of axes | Direct navigation to the first available group of axes downward of the original display area, positioning the farthermost axis of the group adjacent to the bottom border of the display area. |
| 25 | Up/Down | Plurality of groups of axis | Direct navigation to a group of axes not adjacent to the first one if one or more groups of axes located in between is/are collapsed. |
| 26 | Left/Right/ Up/Down | All axes layouts | Upon direct navigation to a document-less portion of a hitherto non-displayed axis, automatic repositioning of the display area on the first axis containing documents in that direction. |

Table 1 illustrates a significant number of possible functions that are not all necessarily represented in the figures. However, a person skilled in the art would understand how to apply all the functions illustrated in table one in light of the examples.

Figure 13:
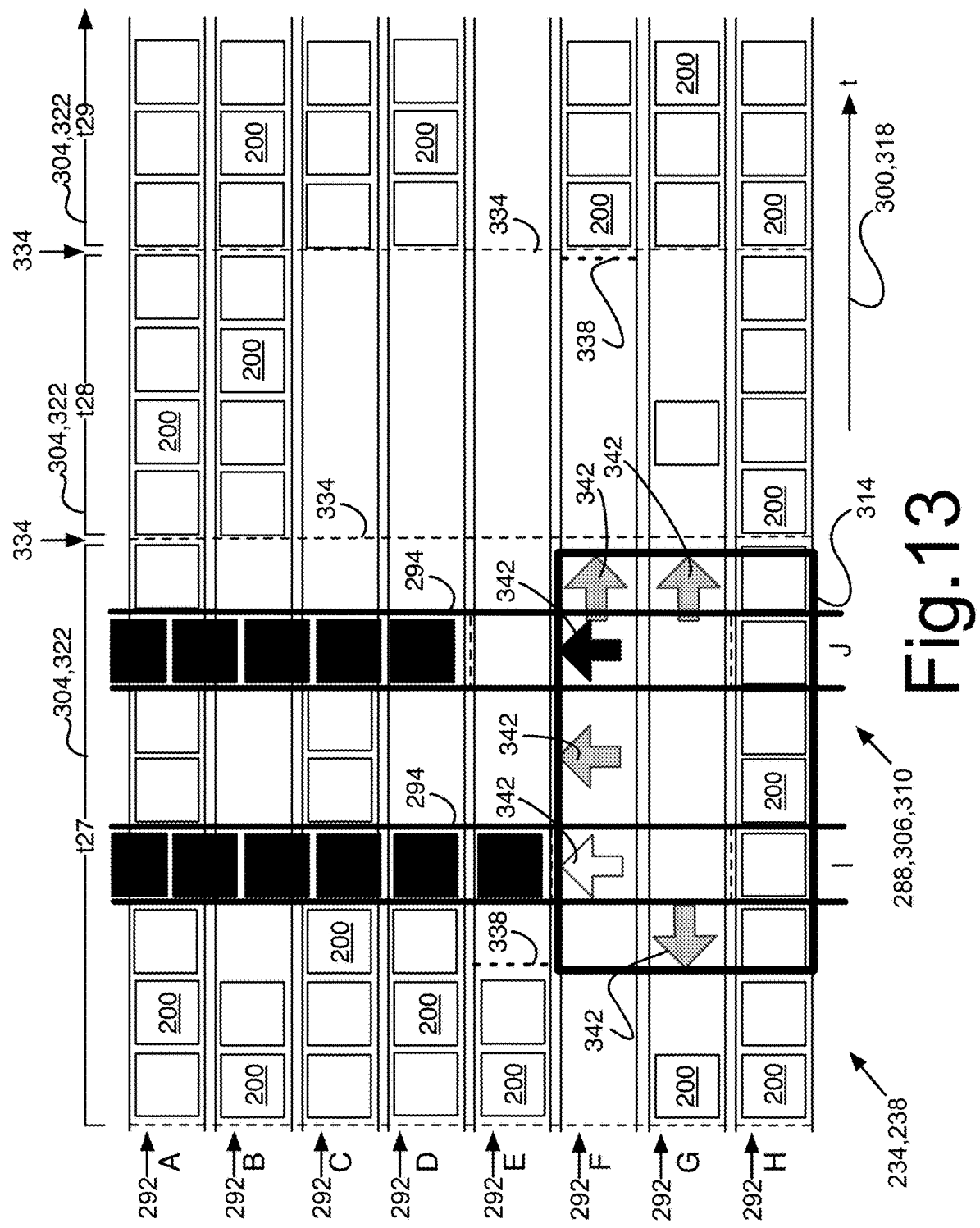
FIG. 13 is a schematic illustration of a display area with navigation means thereon in a context of axes layout in accordance with an embodiment of the present invention.

FIG. 13 illustrates a display area 314 together with the surrounding group of axes 310 and documents 200 to better illustrate the use of the arrows 342. As is illustrated in FIG. 13, arrows 342 may also be disposed on subsidiary axes 294, in this case vertical axes 292 'I' and 'J'. In this case, the longitudinal arrows 346 disposed on the vertical axes are disposed in the same direction as the orthogonal arrow 350 but are embodied in different colors to distinguish the two kinds of arrows 342. The orthogonal arrow 350, which is centered in the display area 314, is embodied in grey, and the longitudinal arrows 346 of axes 292 'I' and 'J' are respectively embodied in white and black. While the longitudinal arrows 346 of axes 292 'I' and 'J' serve the same function, one is embodied in white (a contrasting color chosen arbitrarily for illustrative purposes) to show that the nearest document 200 located outside the display area 314 is located on axis 'I'.

As FIG. 13 illustrates, a great many arrows 342 can be displayed in a display area 314. If desirable, the arrows 342 can be selectively turned on or off by the user. This may be desirable, for instance, if the user wishes to see the display area temporarily without arrows 342 thereon or if he or she knows how many axes 292 are comprised in his or her workspace 306 as well as where the other axes 292 are located in relation to the display area 314. Alternatively, displaying arrows 342 could optionally be omitted if documents 200 appear in the portion of an axis 292 that is visible in the display area 314. Otherwise, the arrows 342 can be displayed after some time or be displayed upon hovering above a predetermined region of the display area 314 with a pointing device.

Figure 14:
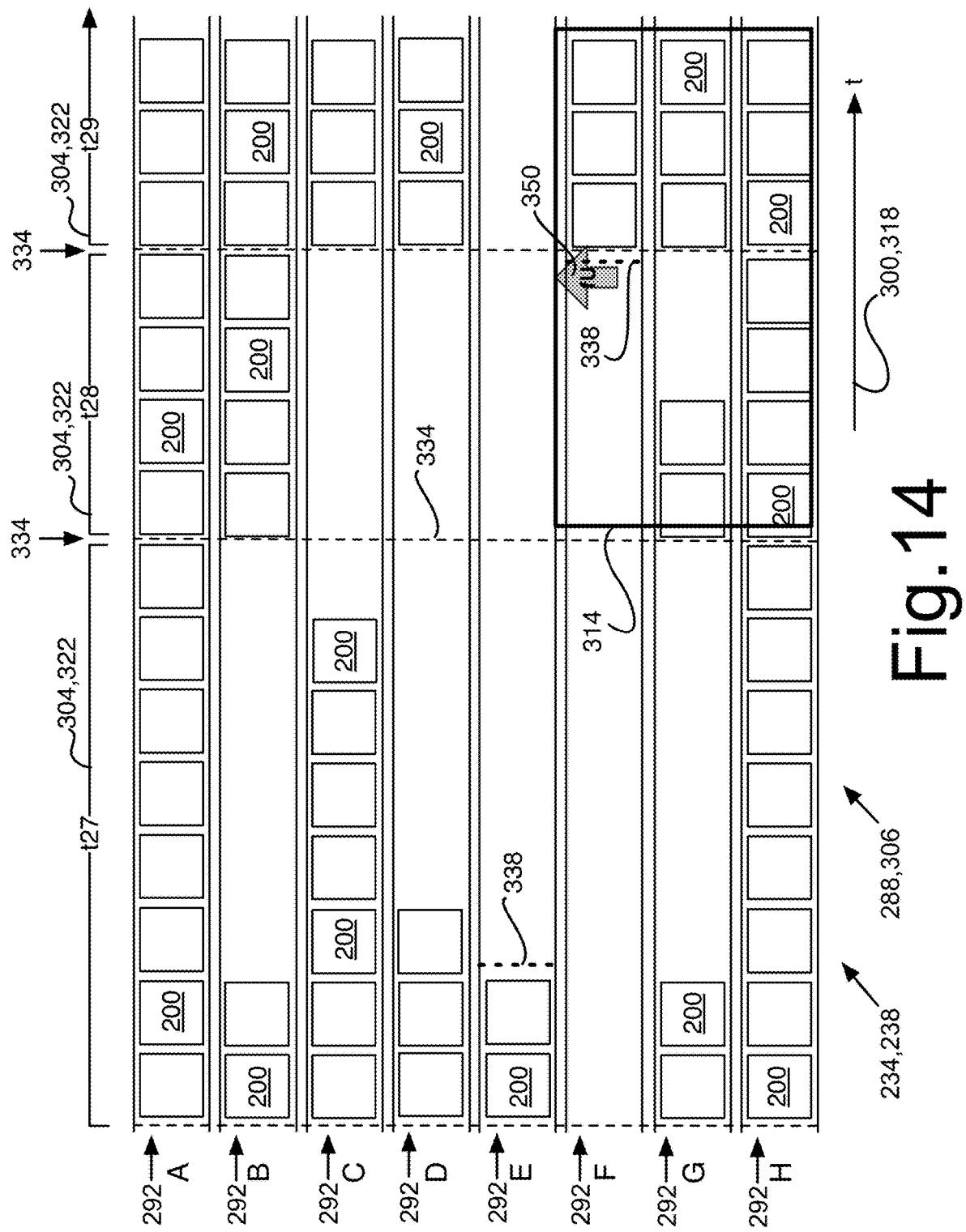
FIG. 14 is a schematic illustration of a display area with navigation means thereon in another context of axes layout in accordance with an embodiment of the present invention.

In FIG. 14 a single arrow 342, namely an orthogonal arrow 350, is illustrated because there is only one navigational possibility, i.e. toward non-displayed axes 292 'A' to 'E' located above. No longitudinal arrow 342 is displayed on axis 292 'F' because, as indicated by end marker 338, no more documents 200 are located to the left of it on axis 292. Likewise, no longitudinal arrow 346 is illustrated to the left of axis 292 'G' or 'H' because documents 200 are displayed in the display area 314 that a user can select. However, arrows 342 could optionally be displayed on axes 292 on which documents 200 appear in the display area 314 so as to indicate whether documents 200 are present outside the display area 314 and, if so, how many and in which direction. Indeed, even when documents 200 are found within the display area 314, large empty areas could exist outside the display area 314 that could make further navigation uncertain, long, or difficult.

Figure 15:
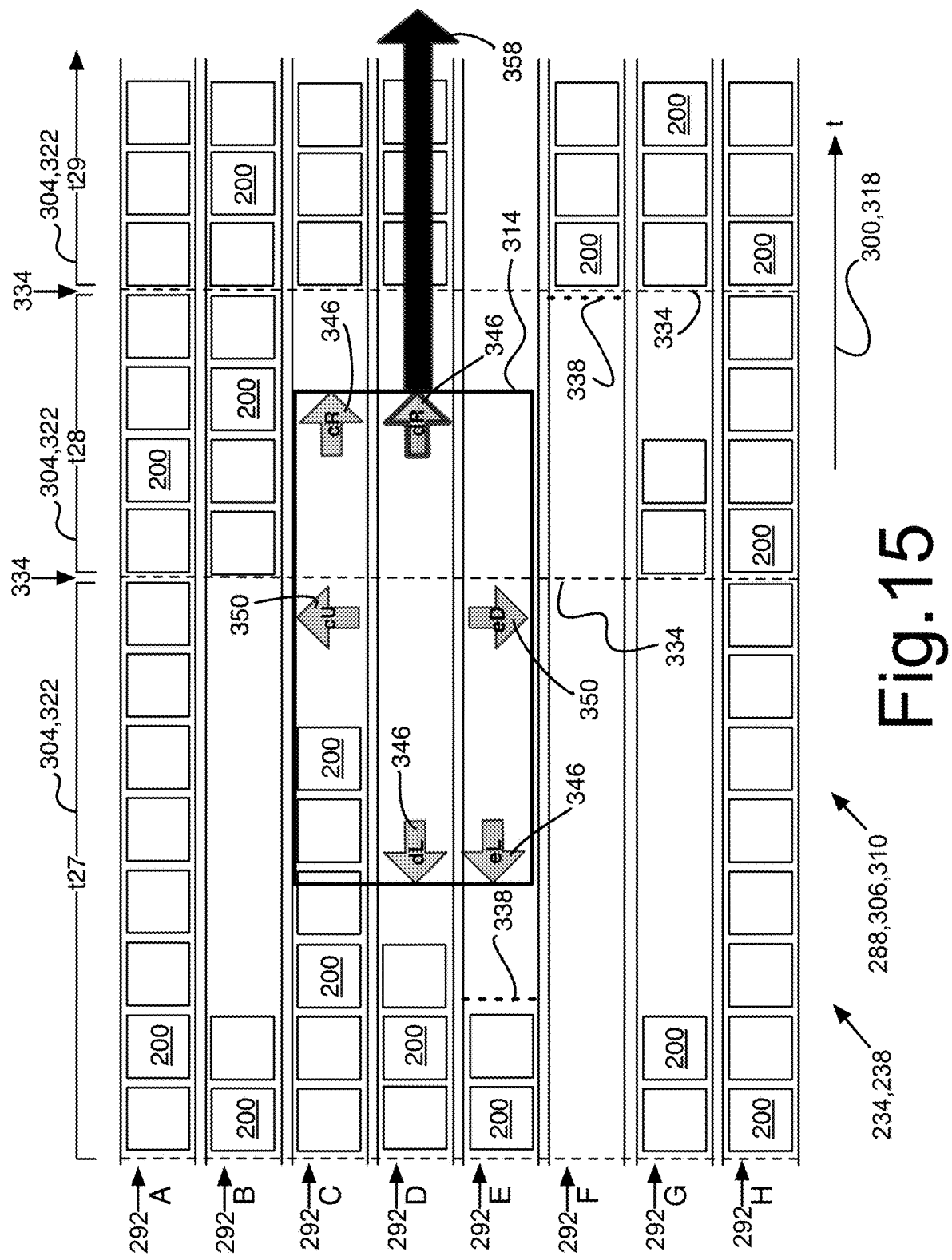
FIG. 15 is a schematic illustration of a display area with navigation means thereon in another context of axes layout in accordance with an embodiment of the present invention.
Figure 16:
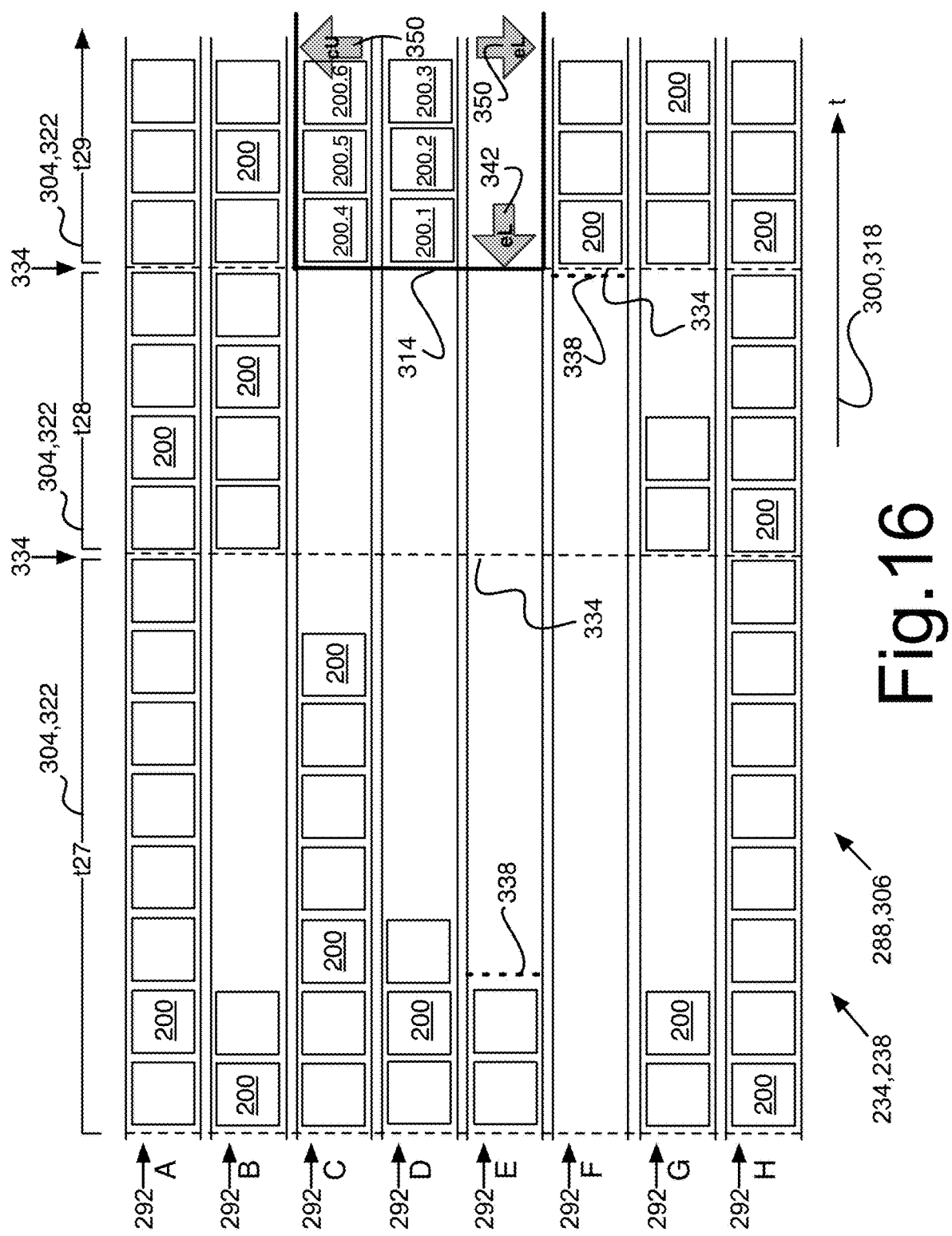
FIG. 16 is a schematic illustration of a display area with navigation means thereon in another context of axes layout in accordance with an embodiment of the present invention.

In FIG. 15, multiple arrows 342 are illustrated, respectively labeled with a first letter corresponding to the axis 292 on which they appear and a second letter to corresponding to the direction in which they point. Orthogonal arrows 350 are illustrated at the top and bottom of the display area 314 since axes 292 are located above and below the display area 314. Two documents 200 and part of a third one are visible in the display area 314 on axis 292 "D". Arrow 342 '$d_R$', which is located to the right of the display area 314 on axis 292 'D', is actuated, as illustrated by a bold line type, either as a result of being selected by a user or on the basis of a system instruction indicating the desired movement of the display area 314. The actuation of arrow 342 '$d_R$' enables a rightward movement of the display area 314 to reach the next available documents 200 on the axis 292, as is illustrated in FIG. 16. An illustrative translation arrow 358 illustrates this rightward movement. Illustrative translation arrows 358 are used in FIG. 16 and henceforth mainly to facilitate understanding in the context of the present specification and do not necessarily appear on the user's screen since they are located outside the display area 314. However, translation arrows 358 may appear inside the display area 314 in some embodiments of the invention. As explained above, the duration of the translation via direct navigation may be very short if the system is configured to instantaneously display the next documents 200 or axes 292 but may also be slower if the system is configured to effect a progressive movement. This is a context in which the display of a translation arrow 358 may be desirable. Translation arrows 358 may, for instance, be displayed along one of the display area's inner edges or in any other location within the display area's 314 frame, pointing in the direction of the translation, and may be displayed for a duration substantially similar to that of the translation. Like the movement of the display area 314, which may not be embodied to be necessarily strictly linear, translation arrows 358 may not be embodied in a strictly linear shape. They may be curved or angled, preferably corresponding to the movement of the display area, but may also be embodied in a shape differing substantially from the movement of the display area, for instance if this is deemed desirable for visualization purposes.

From FIG. 16, one can appreciate that the display area 314 has moved horizontally to the right to seek the next documents 200 on axis 292 a. These next documents 200.1, 200.2, 200.3, 200.4, 200.5 and 200.6 are positioned adjacent to the left-hand side of the display area 314, corresponding to movement #8 in Table 1. In this movement, the display area 314 moves completely away from the documents 200 originally displayed within it to encompass as many new documents 200 as possible. Due to graphical constraints linked to schematization however, only part of the display area 314 is represented in FIG. 16. This movement which brings as many new documents 200 into the display area 314, could be configured to be triggered by a specific type of selection, for instance a simple selection of longitudinal arrow 346 '$d_R$' via a click, tap, point or other form of selection or via an options menu 354 (not shown in FIG. 16). Movement #8 could also be configured to be brought about by another type of selection which could, for example, be part of a set of selection types assigned to various possible movements of the display area 314 according to the level of their complexity or to the distance sought from the original display area 314. In this case, movement #8 could be considered the furthest from the original display area 314 as opposed to movement #6, for instance, which only seeks to bring the first of the next documents 200 into the display area 314. Accordingly, movement #6 could be configured to be brought about by a simple selection and movement #8 by a double selection (e.g. double click, double tap, circling the desired arrow on a touch screen, etc.) of the longitudinal arrow 346 "$d_R$". Such sets of selection types can be configured to automatically enable as many movements as are possible in a given axis 292 configuration. Conversely, all movements could be triggered by the same type of selection, repeated in sequence, until the display area 314 reaches the desired location.

One can appreciate that the same movement of the display area 314 would hardly have been possible without the arrow 342 '$d_R$' (not displayed anymore in FIG. 16) because without the action triggered by the arrow 342 '$d_R$' a user would have needed to blindly guess the existence and position of the documents 200 located on the right side of axis 292 'D'. One can also appreciate from FIG. 16, comparing with FIG. 15, that the longitudinal arrow 346 "$e_L$" located on the left-hand side of the display area 314 on axes 292 'E' remains visible since no documents 200 are visible on the portion of axis 292 'E' that is shown in the display area 314 but some documents 200 are nonetheless located further left of the display area 314. Meanwhile, arrow 346 '$d_L$' has disappeared since documents 200 are now visible on the portion of axis 292 'D' that is displayed in the display area 314. For the same reasons, no arrow 346 '$c_L$' has appeared on axis 292 'C' in FIG. 16.

Figure 17:
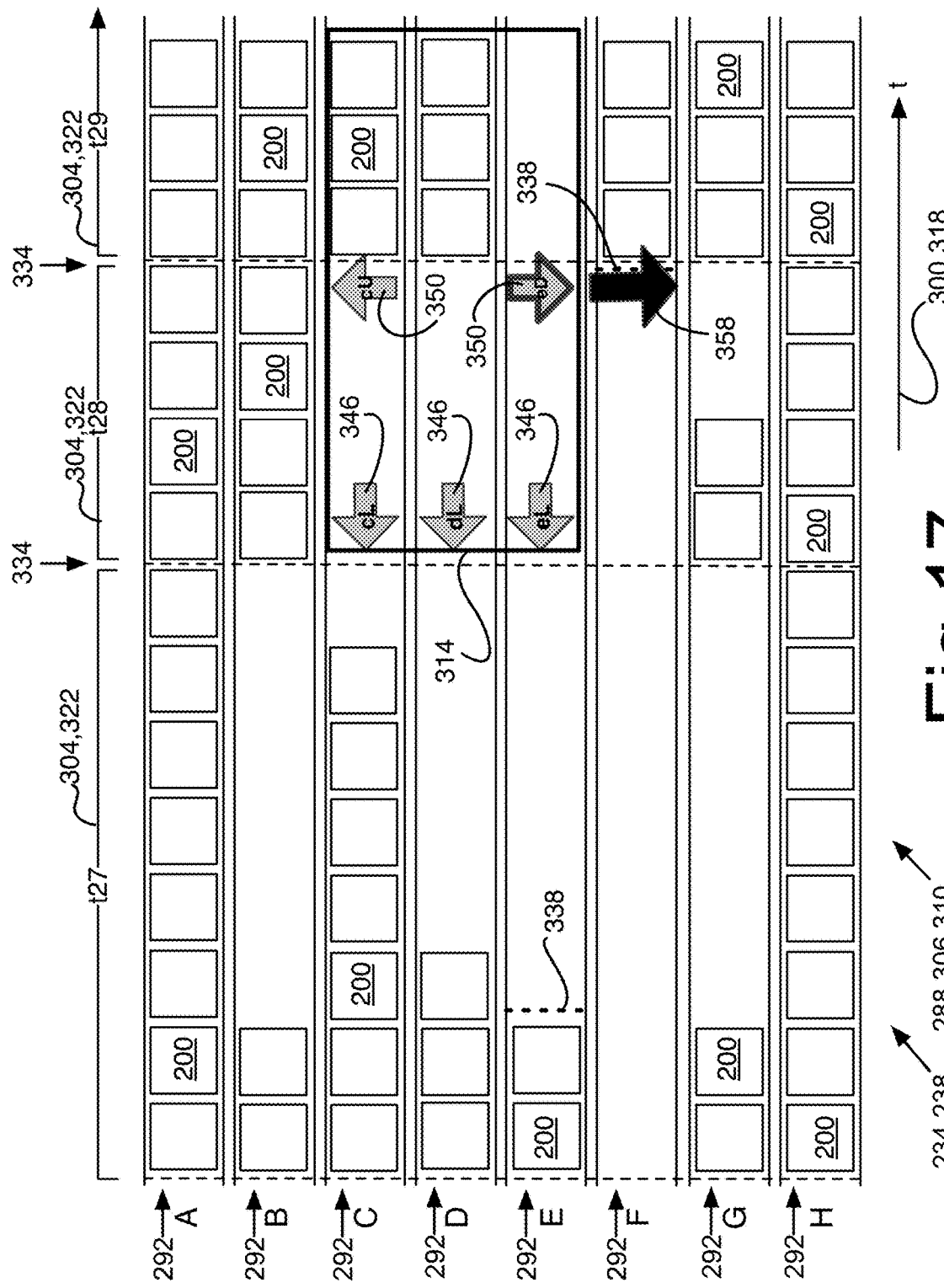
FIG. 17 is a schematic illustration of a display area with navigation means thereon in another context of axes layout in accordance with an embodiment of the present invention.
Figure 18:
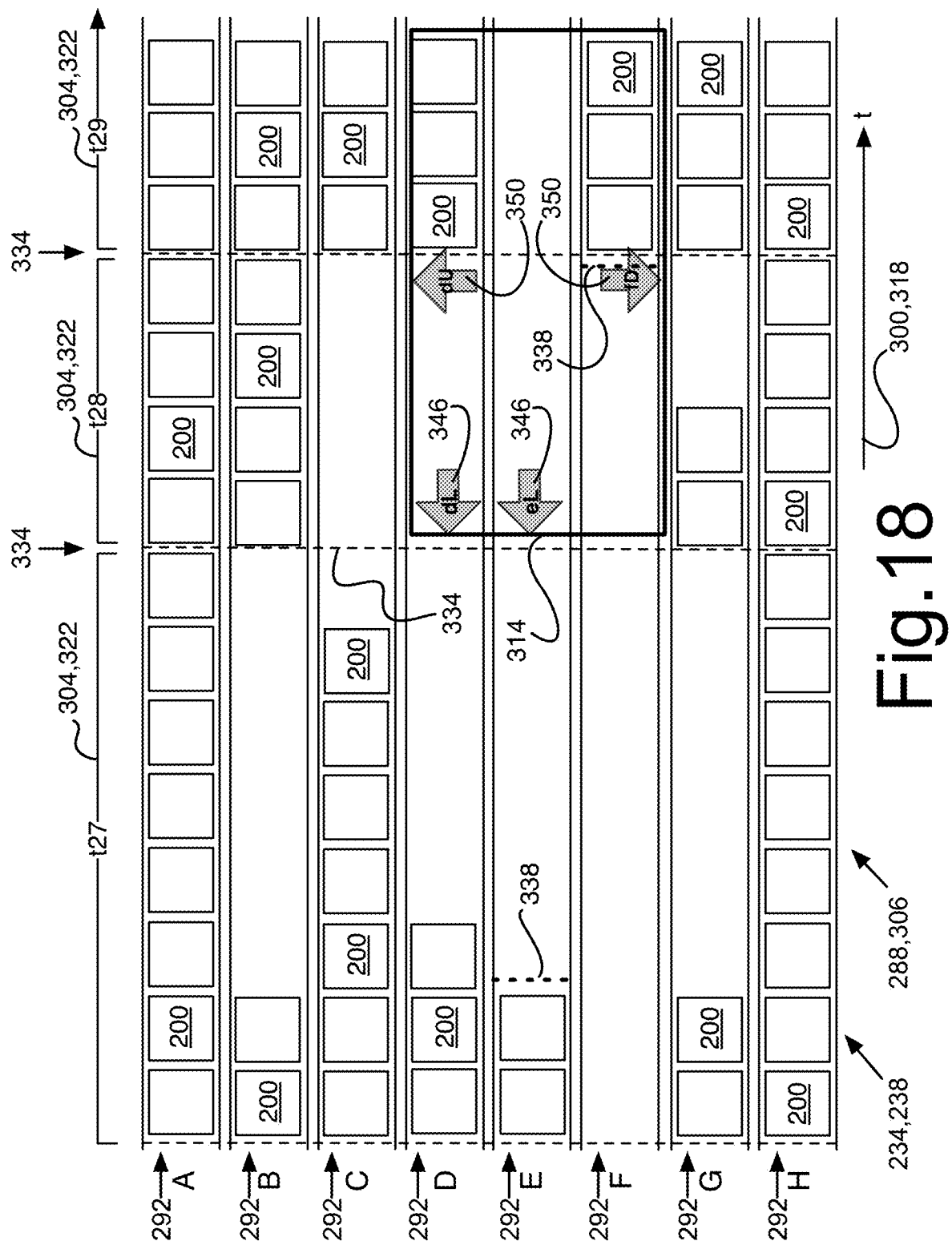
FIG. 18 is a schematic illustration of a display area with navigation means thereon in another context of axes layout in accordance with an embodiment of the present invention.

FIGS. 17 and 18 illustrate another embodiment where orthogonal arrow 350 '$e_D$', once selected, enables a downward movement of the display area 314, bringing the next axis 292 'F' within the display area 314 (shown on FIG. 17). This movement of the display area 314, embodied to bring only axis 292 'F' into the display area 314, corresponds to movement #10 of Table 1. Like in the case of horizontal movements described above, different configurations are possible to enable, further to specific types of selection, the various vertical movements the display area can perform. Indeed, as is explained in Table 1, a display area 314 can move vertically according to any of the following configurations: to encompass only the first of the next axes 292 (movements #9 and #10); to encompass as many of the next available axes 292 including the first one (movements #13 and #14); to encompass as many axes 292 as can fit into the display area 314 including the farthermost axis 292 in the group of axis 310 (movements #15 and #16); or, as shall be explained in the following figures, to reach the next available axis 292 which will display documents 200.

Figure 19:
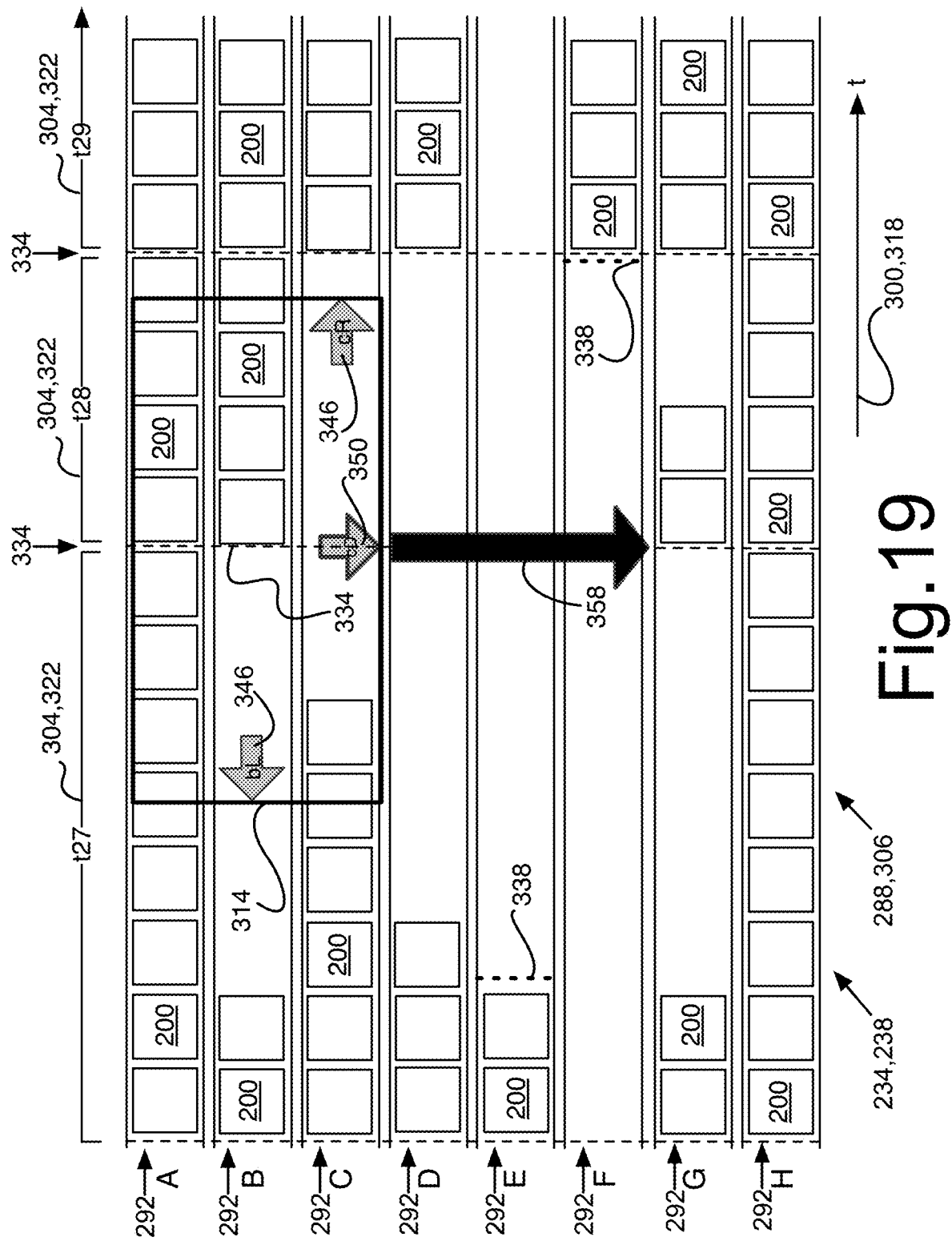
FIG. 19 is a schematic illustration of a display area with navigation means thereon in another context of axes layout in accordance with an embodiment of the present invention.
Figure 20:
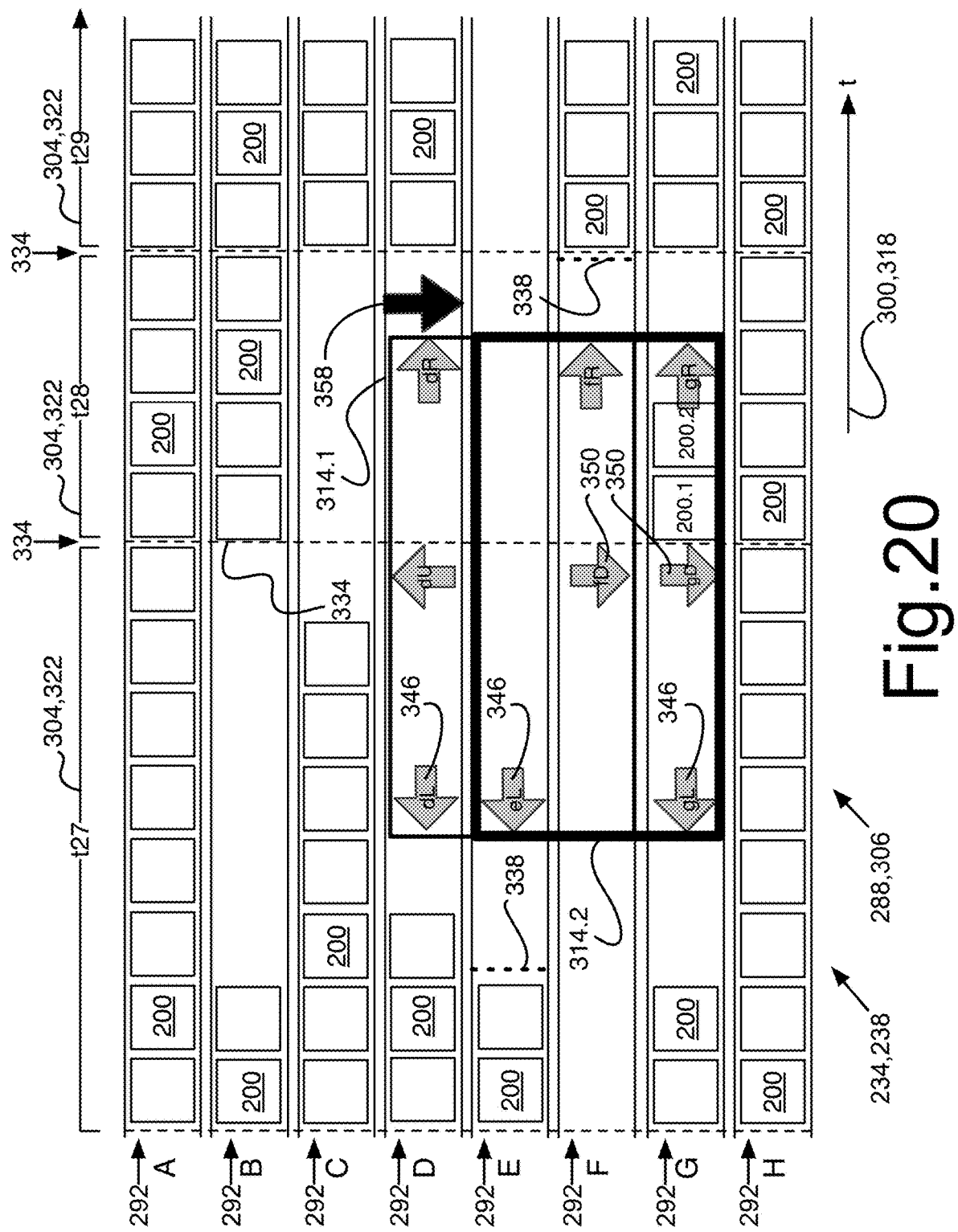
FIG. 20 is a schematic illustration of a vertical movement of a display area with navigation means thereon in another context of axes layout in accordance with an embodiment of the present invention.

FIGS. 19 and 20 together illustrate an embodiment where the display area 314 is automatically repositioned after an initial movement where no documents 200 were found to display in the display area 314. In FIG. 19, the longitudinal arrows 346 are displayed on axes 292 'B' and 'C', being adapted to seek the documents 200 located further in their respective directions, outside the display area 314, and an orthogonal arrow 350 pointing downwards to axes 292 'D' through 'H'. No orthogonal arrow 350 'au' is displayed on axis 292 'A' because there are no axes 292 above axis 292 'A'. Orthogonal arrow 350 'co' is activated, as illustrated by bold line type, for the downward movement of the display area 314 towards axes 292 'D', 'E' and 'F'. This movement corresponds to movement #14 in Table 1. In this movement, clicking on the orthogonal arrow 350 of FIG. 19 causes the display area 314 to move downward to take in as many new axes 292 as possible including the first one downward of the original display area 314.

Accordingly, FIG. 20 illustrates an embodiment where the display area 314 of FIG. 19 makes an initial downward movement on the array 288 to display axes 292 'D', 'E', 'F'. The display area 314 thus leaves axes 292 'A', 'B' and 'C' in FIG. 19 to encompass axes 'D', 'E', 'F' in FIG. 20, illustrated in this Figure as 314.1. This corresponds to movement #14 of Table 1. Following this initial downward movement however, no documents 200 are found on any of the newly displayed axes 292. Therefore, according to an embodiment of the instant invention, the display area 314 is automatically re-positioned so as to encompass at least one new document 200. This automatic repositioning can be configured to take place in response to fruitless orthogonal or longitudinal movements in either direction. It corresponds to movement #26 in Table 1. In FIG. 20, this is done by repositioning display area 314.1 further downward over axes 292 'E', 'F' and 'G' so that documents 200.1 and 200.2 are visible in display area 314.2, further identified by bolder line type for illustrative purposes although this may likely not be reflected in an embodiment of the invention. New arrows 342 then appear in the display area 314.2. As with the other aforementioned features, automatic re-positioning of the display area 314 can be turned on or off by the user. Similarly, the feature could be set to prompt the display area 314.1 to move to the document 200 closest to it, regardless of its longitudinal or orthogonal direction in relation to the movement initially requested.

FIG. 20 also illustrates another possible movement of a display area 314. Rather than a two-step process, a user could move the display area 314 illustrated in FIG. 19 directly to the location of display area 314.2 of FIG. 20 by requesting, via a predefined type of selection, a movement of the display area 314 to the first available axis 292 that will display at least one document 200 in the display area 314. This corresponds to movements #12 and #11 (upward) of Table 1. Both of the movements described in the context of FIG. 20 have their distinct usefulness and can be configured concurrently. Movements #11 and #12 may be useful, for instance, when the user does not have a stated need or desire to see a particular axis 292. He or she can then prompt the system to move the display area 314 to the next available axes 292 in the direction of the arrow 342 selected. In another context, a user may not use the previous function because, for instance, he or she is convinced, albeit mistakenly, that a specific document 200 is located on the next available axis 292. Upon relocating on the next axis 292 however, after the user sees that no documents are located thereon, the display area 314 is automatically repositioned to the next axis 292 containing documents 200. Alternatively, a user may not wish to reach the next axis 292 containing documents 200 in the portion that will be displayed in the display area 314 because he or she may want to reach a specific document 200 following a series of movements. For instance, he or she may want to get to the next available axis 292 in a given direction even though no documents 200 will appear in the display area because it will then allow him or her to scroll left or right subsequently.

Figure 21:
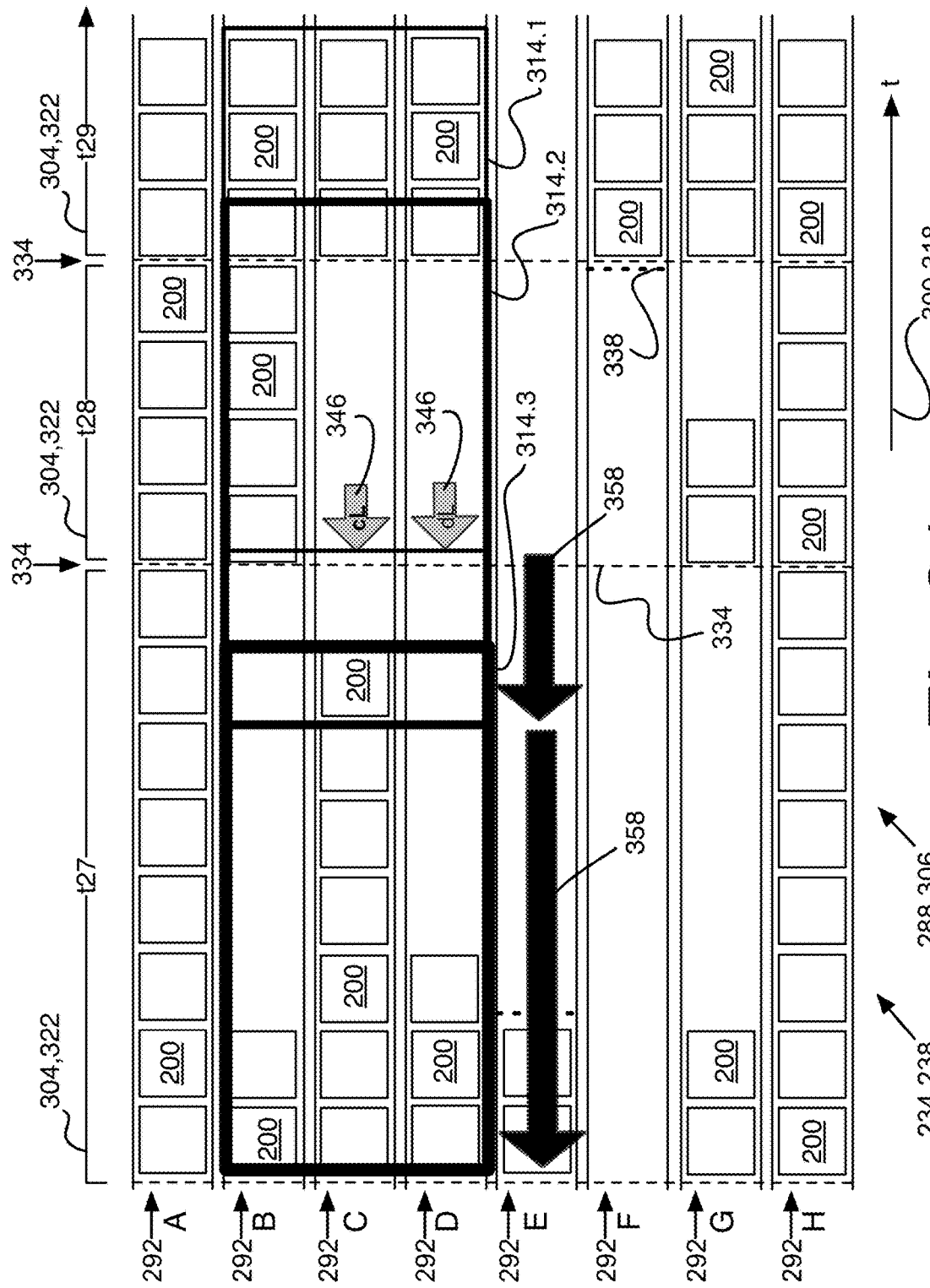
FIG. 21 is a schematic illustration of longitudinal movements of a display area in the context of an axes layout in accordance with an embodiment of the present invention.

FIG. 21 is a synthesis of the various possible longitudinal movement configurations of the display area 314. In FIG. 21, a single group of axes 310 is configured but the same movements apply to configurations presenting more than one group of axes 310. One can appreciate that the longitudinal arrow 346 located on axes 'C' and 'D' on the left of the display area 314.1 can be configured to cause a shift to the left that either brings only the first of the next documents 200 available in that direction into the display area 314 (illustrated as display area 314.2) or as many documents 200 as is possible to fit into the display area 314 that are located in that direction (illustrated as display area 314.3). These movements respectively correspond to movement #5 and movement #7 in Table 1.

Figure 22:
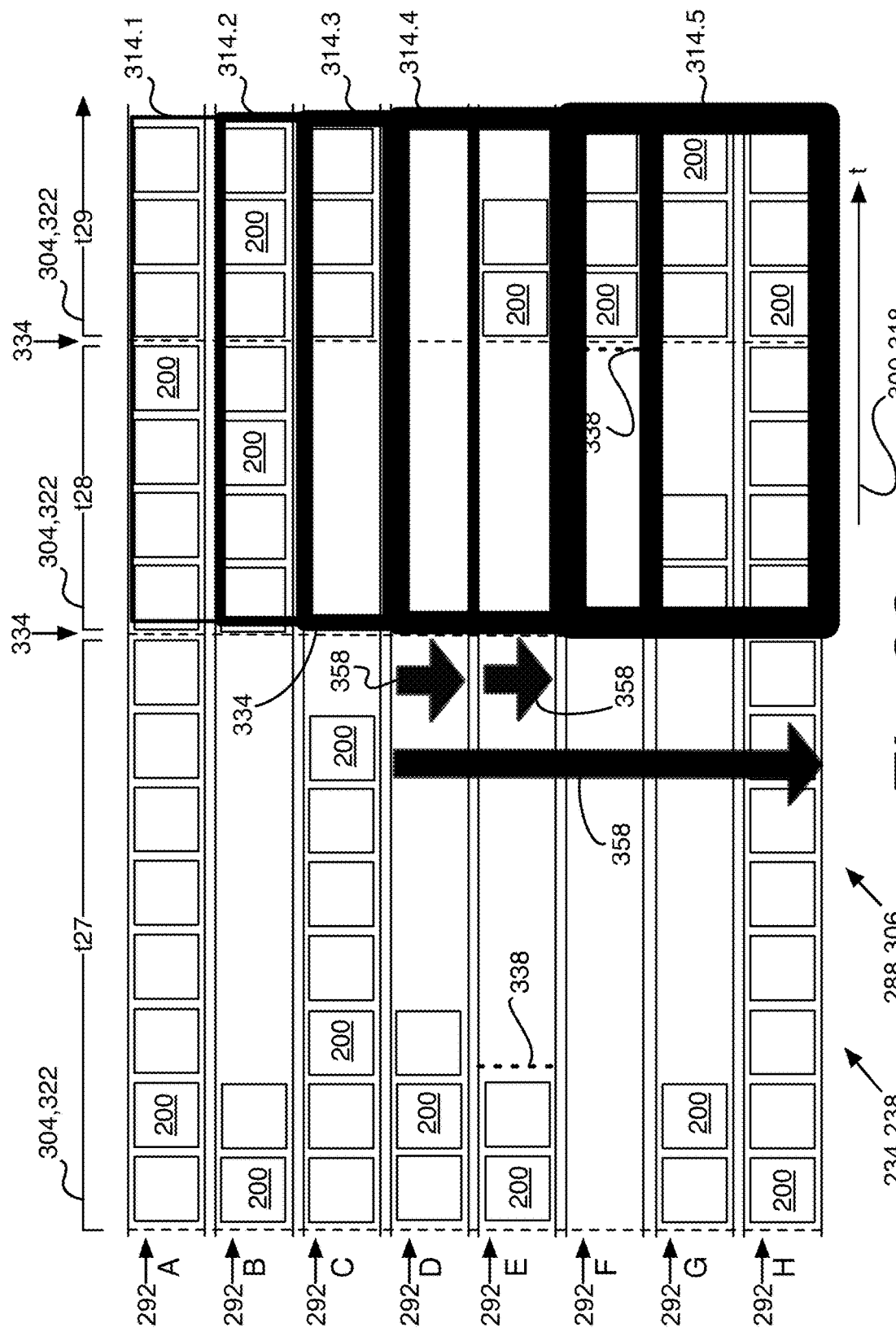
FIG. 22 is a schematic illustration of orthogonal movements of a display area in the context of an axes layout in accordance with an embodiment of the present invention.

FIG. 22 is a synthesis of the various possible orthogonal movement configurations of the display area 314 in a single-axis group 310 context. The display area 314 is initially placed in the top-right corner of the group of axes 310, illustrated by display area 314.1. In this initial position, display area 314.1 encompasses displayable portions of axes 292 'A', 'B' and 'C'. The first possible orthogonal movement is downward to axis 292 'D' (movement #10 in Table 1). Following this movement, display area 314.2 encompasses axes 292 'D', 'C' and 'D'. However, no documents 200 are displayed on axis 292 'D'. Automatic repositioning can be enabled for a single document-less axis. An alternative movement would therefore be to prompt the system to relocate the display area 314.1 on the next axis 292 where displayable documents 200 are located (movement #26 in Table 1). This would bring display area 314.1 to the location of display area 314.3. One could also prompt the system to move display area 314.1 to the next few axes 292 available contiguous to the initial display area 314.1, positioning the next available axis 292 adjacent to the top border of the display area (movement #14). This corresponds to display area 314.4. Finally, a user could prompt the system to bring display area 314.1 to the last, or furthest, available axis 292 located downward of the initial display area 314.1 (movement #16). This would thus bring display area 314.1 to where display area 314.5 is located.

Figure 23:
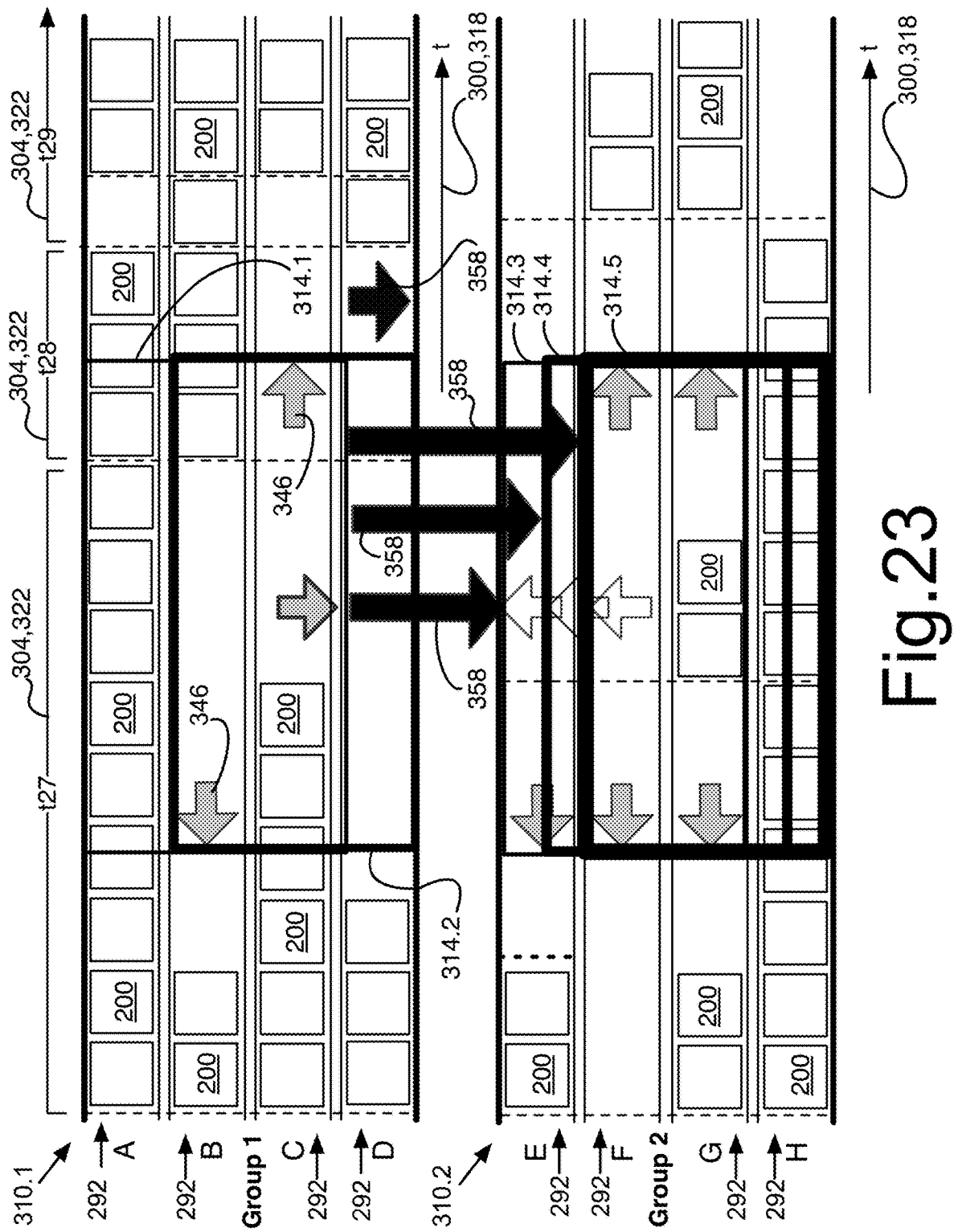
FIG. 23 is a schematic illustration of orthogonal movements of a display area with navigation means thereon in another context of axes layout using more than one group of axes in accordance with an embodiment of the present invention.

FIG. 23 illustrates the various possible movement configurations in the context of multiple groups of axes 292. In this figure, two distinct groups of axes 310 are illustrated; each of the groups of axes 310 having its own time scale 318 and its own time unit markers 334. Arrows 342 are disposed in the display are 240 in accordance with embodiments presented above and now applied to a plurality of groups 310. When, such as in FIG. 23, more than one group of axes 310 is configured and each group presents a plurality of axes 292, multiple means of selection of the arrows 342 can be configured and used to trigger different movements of the display area 314. The display area 314 is initially positioned at the top of the first group of axes 310.1, illustrated by display area 314.1. Based on a first means of selection, the display area 314.1 could move within group 310.1 from displaying axes 292 'A', 'B' and 'C' to displaying axes 292 'D', 'C' and 'D'. This is represented by display area 314.2 (movement #10 in Table 1).

Further to a second type of selection, the initial display area 314.1 could also move from group of axes 310.1 to group 310.2. A first possible movement would be to position it at the top of the next available group, in this case group 310.2 (movement #18). This is represented by display area 314.3. An alternative movement is to relocate the display area 314 in the middle of group 310.2 (movement #22). This may be desirable so as to provide the user with a hint about the number and location of all the axes 292 in this new group of axes 310. This is illustrated in FIG. 23 by display area 314.4. Finally, the display area 314 could be relocated to the farthermost edge of group 310.2, encompassing axes 292 'F', 'G' and 'H' (movement #24). These same movements could be used to navigate between several groups of axes orthogonally disposed in any direction in relation to the first one. Moreover, moving the display area 314 over one or more groups of axes 310 directly to a specified group 310 is also contemplated to be within the scope of this invention and could be carried out, for instance via an options menu 354. All these movements may be configured in advance or upon selection of the orthogonal arrow 350 via a contextual menu 354 or another menu, for instance one located in a menu bar or in a preferences menu.

Turning now to FIG. 24 where a plurality of juxtaposed groups of axes 310 is illustrated. Each group 310 has its own time scale 318 with its own time unit markers 334. Arrows 342 are disposed in the display are 240 in accordance with embodiments presented above and now applied to a plurality of groups 310. In FIG. 24, groups 310.1 to 310.5 are composed of a single axis 292 and can therefore be scrolled while other axes 292 remain in their original position. In this case, the functions ascribed to longitudinal arrows 346 may to some extent duplicate the scrolling of the axis 292 on which they are located since selecting a longitudinal arrow 346 on an axis 292 that is not part of a group of multiple axes 292 will not cause the display area 314 to move over all the axes 292 displayed in it. Nevertheless, arrows 346 may be useful in saving scrolling time in cases where documents 200 are located very far apart on the axis 292.

In the case of orthogonal movements, the movement options applicable to the display area 314 and the behavior thereof are similar to those described in FIG. 23 although they cannot all be illustrated in FIG. 24.

FIG. 25 illustrates another aspect of the invention whereby rather than using the presence or absence of documents 200 or axes 292 in order to determine the position of axes 292 or the display area 314, the system is configured to use document 200 relevance as the basis for movements of the display area 314. Document relevance may be specified by the system, such as if system is configured to gather data on user preference, or may be specified by the user, for instance on the basis of one or more document 200 attributes 296. For instance, in FIG. 25, the display area 314.1, as originally positioned on the right of the axis 292, contains only documents 200 featuring attributes 296 'B' and 'C'. Should a user wish to view documents 200 featuring attribute 296 'A', he or she could build a query 230, for instance via a menu bar or contextual menu 354, requesting to be provided a series of data and actions to the effect of, for instance: 1) knowing whether any document 200 featuring attribute 296 'A' is contained on the axis 292; 2) being provided with arrows 342 indicating the number and direction of such documents 200; and 3) directly navigating thereto. FIG. 25 illustrates such a movement to documents 200 featuring the attribute 296 'A'. A query arrow 362 illustrates this leftward movement. Unlike the illustrative translation arrow 358 illustrated in preceding figures, the query arrow 362 represents a movement based not on distance from the initial display area 314 or on the number of documents 200 to be displayed but on a condition involving the presence of a specific type of document 200 presenting certain characteristics that present meaning to the user. Like other types of arrows, query arrows can be embodied is a variety of shapes, sizes and colors as is appropriate to for both aesthetical or visual differentiation considerations. While a longitudinal movement is illustrated in FIG. 25, filtered navigation based on one or more attributes 296 can be performed in any axis configuration (linear, non-linear) or layout (single axis 292, group of axes 310, several groups 310), and in any direction.

Like in previous figures, a plurality of configurations exists to set the parameters for positioning the display area 314 in relation to the relevant document 200. Like in previous figures also, these possible configurations can be made available to the user in a variety of ways (contextual menu, menu bar, preferences menu, number and type of selection, etc.)

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon computer-readable instructions that, when executed by a computer, perform a method of sequentially displaying, on a device, each axis from a set of axes of user-selectable images, the axes of user-selectable images including a displayed portion of each axis of user-selectable images on a viewing area of the device, and each axis including undisplayed user-selectable images accessible through user navigation, the user-selectable images being chronologically disposed along the each axis with a corresponding timeline, the method comprising:

(a) displaying, on the viewing area, a first group of user selectable images on a first axis in an axial direction with a plurality of first time marks, wherein each of the displayed first time marks corresponds to a first timescale and spacings between two consecutive first time marks are of a constant length along the first axis, the spacings each representing a first duration of time between consecutive first time marks;

(b) receiving a user input;

(c) upon the user input, displaying on the viewing area, in the axial direction, both:

(i) a second group of user selectable images on a second axis with a plurality of second time marks disposed between some pairs of consecutive user selectable images, wherein each of the displayed second time marks corresponds to a second timescale and a plurality of consecutive second time marks are spaced apart at different lengths along the second axis, the time duration between consecutive second time marks representing a second time duration; and (ii) an orthogonal navigation arrow displayed between two adjacent user selectable images on the second axis, the orthogonal navigation arrow being aligned with the second time mark displayed on the second axis and pointing at a 90-degree angle from the axial direction of the second axis for viewing, on the viewing area, a portion of a third group of user selectable images on the displayed portion of a third axis; and (d) displaying in the axial direction, on the viewing area, the third group of user selectable images on the displayed portion of a third axis with a plurality of third time marks, wherein a duration of time is represented by the spacing between at least two consecutive third time marks;

(e) receiving a user selection of the orthogonal navigation arrow;

(f) wherein, based on the user selection of said orthogonal navigation arrow for viewing user selectable images on the third axis with third time marks, performing said step (d), wherein selecting the orthogonal navigation arrow associated with the second axis is displaying the third axis at an axial chronological position related to an axial chronological position of the orthogonal navigation arrow along the second axis, the first duration of time being greater than the second duration of time and the second duration of time being greater than the third duration of time.

2. The non-transitory computer-readable medium of claim 1, wherein the first timescale is a yearly timescale representing a year duration of time between consecutive first time marks, the second timescale is a monthly time scale representing a month duration of time between consecutive second time marks, and the third timescale is a daily timescale representing a time duration of a day between consecutive third time marks.

3. The non-transitory computer-readable medium of claim 1, wherein the first timescale is a yearly timescale representing at least a year duration of time in a multiple of a year between consecutive first time marks, the second timescale is a monthly time scale representing at least a month duration of time in a multiple of a month between consecutive second time marks, and the third timescale is a daily timescale representing a time duration of at least a day in a multiple of a day between consecutive third time marks.

4. The non-transitory computer-readable medium of claim 1, wherein the orthogonal navigation arrow is configured to display a thumbnail of a user-selectable image of the third axis located at a related axial chronological position of the second axis.

5. The non-transitory computer-readable medium of claim 1, wherein the axes of user-selectable images are displayed vertically on the viewing area.

6. The non-transitory computer-readable medium of claim 1, wherein the device is a mobile phone.

7. The non-transitory computer-readable medium of claim 1, wherein at least some of the user-selectable images are videos.

8. The non-transitory computer-readable medium of claim 1, wherein the second group of user selectable images on the second axis is including additional user-selectable images together with at least one user-selectable from the user-selectable displayed on the first axis.

9. The non-transitory computer-readable medium of claim 1, wherein the user-selectable images include a quadrilateral shape.

10. A method of sequentially displaying, on a device, each axis from a set of axes of user-selectable images, the axes of user-selectable images including a displayed portion of each axis of user-selectable images on a viewing area of the device, and each axis including undisplayed user-selectable images accessible through user navigation, the user-selectable images being chronologically disposed along the each axis with a corresponding timeline, the method comprising:

(a) displaying, on the viewing area, a first group of user selectable images on a first axis in an axial direction with a plurality of first time marks, wherein each of the displayed first time marks corresponds to a first timescale and spacings between two consecutive first time marks are of a constant length along the first axis, the spacings each representing a first duration of time between consecutive first time marks;

(b) receiving a user input;

(c) upon the user input, displaying on the viewing area, in the axial direction, both:

(i) a second group of user selectable images on a second axis with a plurality of second time marks disposed between some pairs of consecutive user selectable images, wherein each of the displayed second time marks corresponds to a second timescale and a plurality of consecutive second time marks are spaced apart at different lengths along the second axis, the time duration between consecutive second time marks representing a second time duration; and (ii) an orthogonal navigation arrow displayed between two adjacent user selectable images on the second axis, the orthogonal navigation arrow being aligned with the second time mark displayed on the second axis and pointing at a 90-degree angle from the axial direction of the second axis for viewing, on the viewing area, a portion of a third group of user selectable images on the displayed portion of a third axis; and (d) displaying in the axial direction, on the viewing area, the third group of user selectable images on the displayed portion of a third axis with a plurality of third time marks, wherein a duration of time is represented by the spacing between at least two consecutive third time marks;

(e) receiving a user selection of the orthogonal navigation arrow;

(f) wherein, based on the user selection of said orthogonal navigation arrow for viewing user selectable images on the third axis with third time marks, performing said step (d), wherein selecting the orthogonal navigation arrow associated with the second axis is displaying the third axis at an axial chronological position related to an axial chronological position of the orthogonal navigation arrow along the second axis, the first duration of time being greater than the second duration of time and the second duration of time being greater than the third duration of time.

11. The method of claim 10, wherein the first timescale is a yearly timescale representing a year duration of time between consecutive first time marks, the second timescale is a monthly time scale representing a month duration of time between consecutive second time marks, and the third timescale is a daily timescale representing a time duration of a day between consecutive third time marks.

12. The method of claim 10, wherein the first timescale is a yearly timescale representing at least a year duration of time in a multiple of a year between consecutive first time marks, the second timescale is a monthly time scale representing at least a month duration of time in a multiple of a month between consecutive second time marks, and the third timescale is a daily timescale representing a time duration of at least a day in a multiple of a day between consecutive third time marks.

13. The method of claim 10, wherein the orthogonal navigation arrow is configured to display a thumbnail of a user-selectable image of the third axis located at a related axial chronological position of the second axis.

14. The method of claim 10, wherein the axes of user-selectable images displayed vertically on the viewing area.

15. The method of claim 10, wherein the device is a mobile phone.

16. The method of claim 10, wherein at least some of the user-selectable images are videos.

17. The method of claim 10, wherein the second group of user selectable images on the second axis is including additional user-selectable images together with at least one user-selectable from the user-selectable displayed on the first axis.

18. The method of claim 10, wherein the user-selectable images include a quadrilateral shape.

\* \* \* \* \*